US006862582B2

(12) United States Patent
Harada et al.

(10) Patent No.: US 6,862,582 B2
(45) Date of Patent: *Mar. 1, 2005

(54) PRODUCTION PROTECTION SYSTEM DEALING WITH CONTENTS THAT ARE DIGITAL PRODUCTION

(75) Inventors: Shunji Harada, Osaka (JP); Masayuki Kozuka, Arcadia, CA (US); Masataka Minami, Burbank, CA (US); Makoto Tatebayashi, Takarazuka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/729,186

(22) Filed: Dec. 5, 2003

(65) Prior Publication Data

US 2004/0139026 A1 Jul. 15, 2004

Related U.S. Application Data

(62) Division of application No. 09/415,169, filed on Oct. 8, 1999, now Pat. No. 6,687,683.

(30) Foreign Application Priority Data

Oct. 16, 1998 (JP) .......................................... 10-295829
Mar. 31, 1999 (JP) ............................................. 11-92557

(51) Int. Cl.[7] .............................................. G06F 17/60
(52) U.S. Cl. ........................... 705/51; 705/50; 713/150; 380/255
(58) Field of Search ..................... 705/50, 51; 713/150; 380/255

(56) References Cited

U.S. PATENT DOCUMENTS

| 5,109,152 A | 4/1992 | Takagi et al. |
| 5,343,527 A | 8/1994 | Moore |
| 5,633,839 A | 5/1997 | Alexander et al. |
| 5,734,719 A | 3/1998 | Tsevdos et al. |
| 6,069,952 A | 5/2000 | Saito et al. |
| 6,226,618 B1 | 5/2001 | Downs et al. |
| 6,301,513 B1 | 10/2001 | Divon et al. |
| 2001/0019615 A1 | 9/2001 | Kato et al. |

FOREIGN PATENT DOCUMENTS

GB 0718756 6/1996

OTHER PUBLICATIONS

Needham et al., "Using Encryption for Authentication in Large Networks of Computers", 1978, ACM.*

* cited by examiner

Primary Examiner—James P. Trammell
Assistant Examiner—Jalatee Worjloh

(57) ABSTRACT

A data protection system obtains data having a first content on which a first encryption has been performed and a second content on which a second encryption has been performed, the second encryption more difficult to break than the first encryption. A first content decryption unit decrypts the first content, using a first encryption method corresponding to the first encryption of the first content. A second content decryption unit decrypts the second content using a second decryption method that corresponds to the second encryption. The decrypting contents can be executed by a software, and the second content decryption unit can include one of tamperproof hardware and an apparatus that executes tamperproof software.

4 Claims, 11 Drawing Sheets

PRODUCTION PROTECTION SYSTEM DEALING WITH CONTENTS THAT ARE DIGITAL PRODUCTION

This is a divisional application of U.S. Ser. No. 09/415,169, filed on Oct. 8, 1999 now U.S. Pat. No. 6,687,683.

This application is based on application Nos. 10-295829 and 11-092557 filed in Japan, the contents of which are hereby incorporated by reference.

BACKGROUND OF THE INVENTION (1) Field of the Invention

The present invention relates to a system for technically realizing copyright protection of digital production, and especially relates to copyright protection technologies in replaying and recording contents that are digital production.

(2) Description of the Prior Art

Due to the recent development of Internet-related technologies, it is possible to distribute contents such as music through the Internet and to receive charges from the users who have downloaded distributed contents.

On the other hand, digital production that have been downloaded on personal computers through the Internet can be easily duplicated. In order to prevent unauthorized duplication, for instance, encryption technologies are used.

When a content for sale is provided through the Internet, the sample of the content with a lower quality may be also provided for sales promotion. For instance, users are supposed to purchase a content after trying the free sample of the content.

In this case, since the provider wants the sample to be tried by as many as users and clients, it is desirable that the sample can be replayed by personal computers connected to the Internet as the hardware. Note that in some cases, the provider may want control the distribution and replay of the sample to some extent, so that the content of the sample is assumed to be encrypted.

However, if the content for sale and the content of the sample are encrypted in the same encryption system and provided through the Internet in response to the request, the content for sale is equally vulnerable to fraudulent acts such as analysis of the encryption algorithm as the content of the sample.

SUMMARY OF THE INVENTION

It is accordingly an object of the present invention to provide a production protection system that enables less important contents to be replayed by general personal computers and more important contents to be highly protected against fraudulent attacks when the combination of two kinds of content with different degrees of importance such as contents for sale and trial is distributed.

Another object of the present invention is to provide a production protection system that enables contents to be recorded on a recording medium loaded on a player for replaying contents and the like in order to more intensively protect contents for sale, and enables one of encryption algorithms for distributing contents via the Internet and for recording contents on the recording medium not to be influenced by the decryption of the other one.

A further object of the present invention is to provide a production protection system that enables to reduce cost when encryption algorithms for distribution and recording are realized by software and hardware by using encryption algorithms that share parts with each other.

In order to achieve the above-mentioned first object, the production protection system according to the present invention is a production protection system dealing with contents that are digital production that may include: an obtaining unit for obtaining data including at least one of a first content, on which first encryption has been performed and a second content, on which second encryption has been performed, the second encryption is more difficult to break than the first encryption; a first content decryption unit for decrypting the first content using a first decryption method that corresponds to the first encryption when the data that has been obtained by the obtaining unit includes the first content; and a second content decryption unit for decrypting the second content using a second decryption method that corresponds to the second encryption and is more difficult than the first decryption method when the data that has been obtained by the obtaining unit includes the second content.

By means of the production protection system, when the first and second contents are obtained, on each of which a different degree of encryption has been performed on due to the different two degrees of importance, each of the first and second contents is separately decrypted. As a result, the second content, which is more important, may be intensively protected against fraudulent acts with encryption that is difficult to break. Note that the difficulty of breaking encryption can be ensured logically by using a more complicated encryption algorithm and at implementation level by using tamperproof hardware, for instance.

Note that the apparatuses that realize the first and second content decryption units, which decrypt different contents, may be different ones. For instance, less important contents may be widely used by being decrypted and replayed by a personal computer, and more important contents may be highly protected against fraudulent acts by being decrypted, replayed, and recorded by a special-purpose apparatus.

As a result, for instance, less important contents for trial and more important contents for sale may be distributed using networks and recording media with security.

By means of the production protection system, wherein the obtaining unit and the first content decryption unit are realized by a personal computer that executes software for decrypting contents, and the second content decryption unit is realized by one of tamperproof hardware and an apparatus that executes tamperproof software, the first content is decrypted and, for instance, may be replayed by the personal computer for wide, general use. On the other hand, the second content, which is more important, is decrypted and, for instance, may be replayed and recorded by special-purpose hardware to be highly protected against fraudulent acts.

By means of the production protection system, wherein the obtaining unit obtains the data by receiving the data from an outside network, the production protection system that may further include: a replay unit for audio-visually replaying the first content that has been decrypted by the first content decryption unit; an encryption unit for performing third encryption, which is different from the second encryption, on the second content that has been decrypted by the second content decryption unit; and a recording unit for recording at least part of the second content on which the third encryption has been performed by the encryption unit on a recording medium, less important contents for trial and more important contents for sale may be distributed via networks with security. For instance, when digital production such as video, music, and still pictures, is created, contents for trial such as a music content sampled at a lower sampling rate with a lower quality and a digest edition of a video may be widely distributed through the network for the purpose of sales promotion with security. Meanwhile, contents for trial may be decrypted by the personal computer, so that wide, general user may try the contents, and contents for sale may be recorded on a recording medium such as a memory card only by special-purpose hardware, so that high security may be ensured and unauthorized recording may be prevented. In addition, the contents recorded on a recording medium such as a memory card are encrypted, so that the contents may be protected against peeping.

Furthermore, different encryption is used for the distribution and the recording of second contents, so that even if an encryption algorithm is decrypted, another one is not influenced. As a result, the above-mentioned second object is realized.

By means of the production protection system, wherein the encryption unit and a data communication channel between the second content decryption unit and the encryption unit are realized by one of tamperproof hardware and an apparatus that executes tamperproof software, it is necessary to encrypt second contents for sale after decryption according to a standard for recording on a recording medium. It is possible to ensure security that peeping of second contents after decryption are prevented by performing operations from the decryption to encryption by tamperproof hardware or software.

By means of the production protection system, wherein an encryption algorithm that is used by the second content decryption unit partially differs from an encryption algorithm that is used for encryption by the encryption unit, part of the software or the hardware that realize the encryption algorithms is shared, so that cost of developing or realizing the encryption algorithms may be reduced compared with the case where part of the software or the hardware is not shared. As a result, the above-mentioned third object is realized.

By means of the production protection system that may further include: a PC connecting unit for connecting to the personal computer via a predetermined interface; and a recording medium loading unit where the recording medium is set, wherein the second content decryption unit, the encryption unit, the recording unit, the PC connecting unit, and the recording medium loading unit are realized by a piece of hardware, the second content decryption unit obtains the second content in the data that has been obtained by the obtaining unit via the PC connecting unit and decrypts the obtained second content, and the recording unit records the second content on the recording medium that has been set in the recording medium loading unit, the operations from the decryption to the recording of second contents may be realized in one piece of specific hardware, so that the scrutiny against unauthorized recording may be ensured.

By means of the production protection system, wherein the data that is to be obtained by the obtaining unit includes control information, which has been encrypted, for controlling operations on each content included in the obtained data, and at least one of the first content decryption unit and the second content decryption unit includes a control information decryption unit for decrypting the control information and by means of the production protection system, wherein the second content decryption unit includes the control information decryption unit, and the personal computer that realizes the second content decryption unit further executes software for decrypting the control information, control information for controlling operations of each content such as charging information and information on decryption conditions may be encrypted and distributed, so that the security of control information may be secured.

By means of the production protection system, wherein the control information includes a key used for decrypting the second content, the control information decryption unit further includes a first authentification encryption unit, and the second content decryption unit further includes a second authentification encryption unit, wherein the first authentification encryption unit performs authentification of the second authentification encryption unit, performs encryption communication with the second authentification encryption unit, and transmits the key in the control information that has been decrypted by the control information decryption unit to the second authentification encryption unit when the authentification is successfully performed, the second authentification encryption unit performs authentification of the first authentification encryption unit, performs encryption communication with the first authentification encryption unit, and obtains the key, and the second content decryption unit decrypts the second content using the key that the second authentification encryption unit has obtained, the first authentification encryption unit transmits the key for decrypting the second content to the second authentification encryption when the authentification has been successfully performed. As a result, the key may be transmitted with security and unauthorized duplication of the second content may be prevented from the part where the control information is decrypted to the part where the second content is decrypted.

By means of the production protection system, wherein the first content is a music content for trial, and the second content is a music content for sale and has a higher audio quality than the first content, music contents for trial and sale may be distributed on the networks with security.

By means of the production protection system that may further include a replay unit for replaying the first content that has been decrypted by the first content decryption unit, the user may listen to music contents for trial that have been downloaded.

By means of the production protection system, wherein the encryption unit may include: a master key storage unit for storing a master key in advance; a disk key creation unit for creating a disk key; a disk key encryption unit for encrypting the disk key that has been created by the disk key creation unit using the master key; a title key creation unit for creating a title key; a title key encryption unit for encrypting the title key that has been created by the title key creation unit using the disk key; and a content encryption unit for encrypting at least part of the second content that has been decrypted by the second content decryption unit using the title key, and the recording unit records the disk key that has been encrypted by the disk key encryption unit, the title key that has been encrypted by the title key encryption unit, and the second content that has been encrypted by the content encryption unit on the recording medium, two-tier of encryption is performed using the disk and title keys on a content, so that the content is decrypted only by an apparatus that has the master key. As a result, a content that has been recorded on a recording medium is highly protected, and unauthorized duplication by general users may be protected.

In addition, the security of the content may be improved by writing the disk and title keys in an area on the recording medium that cannot be accessed by the user. Note that when the recording medium is a DVD (Digital Video Disc), the production protection system can be provided for a DVD replaying apparatus.

By means of the production protection system, wherein inherent information that is inherent in the recording medium is recorded on the recording medium in advance, and the disk key creation unit creates the disk key according to the inherent information on the recording medium and by means of the production protection system, wherein an inherent disk key inherent in the recording medium that has been encrypted using a master key is recorded on the recording medium in advance, the encryption unit may include: a master key storage unit for storing the master key in advance; a disk key creation unit for creating a disk key by decrypting the inherent disk key on the recording medium using the master key; a title key creation unit for creating a title key; a title key encryption unit for encrypting the title key that has been created by the title key creation unit using the disk key; and a content encryption unit for encrypting at least part of the second content that has been decrypted by the second content decryption unit using the title key, and the recording unit records the title key that has been encrypted by the title key encryption unit and the second content that has been encrypted by the content encryption unit on the recording medium, different encryption is performed for a different recording medium. As a result, the security of encryption is improved. Meanwhile, it is possible to check whether recording has been correctly performed by referring to the disk key and the inherent information on the recording medium. As a result, replaying may be performed only when the recording is correct.

By means of the production protection system, wherein the title key creation unit creates the title key according to information, which is part of the second content that has been decrypted by the second content decryption unit, different encryption is performed for a different content. As a result, the security of encryption is improved.

By means of the production protection system, wherein the recording medium includes a recording apparatus authentification unit for transmitting authentification information, and the recording unit judges correctness of the recording medium according to the authentification information that has been transmitted from the recording apparatus authentification unit, and performs the recording, in which at least part of the second content on which the third encryption has been performed is recorded on a recording medium, only when the recording medium is correct, unauthorized recording may be prevented that enables peeping of the contents.

By means of the production protection system, wherein the data that is to be obtained by the obtaining unit includes first content charging information, which is charging information on decryption of the first content when the data to be obtained includes the first content, and the data that is to be obtained includes second content charging information, which is charging information on decryption of the second content when the data to be obtained includes the second content, the first content decryption unit performs a charging operation according to the first content charging information when the first content is decrypted, and the second content decryption unit performs the charging operation according to the second content charging information when the second content is decrypted, it is possible to charge for the decryption of contents. As a result, contents may be easily sold. More specifically, a sales system may be realized in which the property right of a content is given to the user by charging on the decryption.

By means of the production protection system, wherein the first encryption is performed using a first key, the second encryption is performed using a second key, which has a larger data size than the first key, the data that is to be obtained by the obtaining unit further includes control information, which has the first and second keys, for controlling operations on each content included in the data to be obtained, the first content decryption unit decrypts the first content using the first key, and the second content decryption unit decrypts the second content using the second key, a key is not fixedly included in an apparatus that decrypts contents. As a result, a different content may be decrypted using a different key. Note that the location of a key is not known by general users, the key is not recognized by the users.

By means of the production protection system, wherein the control information is encrypted using a control key that has been derived from a third key and a system common key, and included in the data that is to be obtained by the obtaining unit, the third key is encrypted using a fourth key and included in the data that is to be obtained, the first content decryption unit includes a first control information decryption unit for storing the system common key and a fifth key corresponding to the fourth key in advance, decrypting the third key using the fifth key, deriving the control key from the decrypted third key and the system common key, and decrypting the control information using the control key, and the second content decryption unit includes a second control information decryption unit for storing the system common key and the fifth key corresponding to the fourth key in advance, decrypting the third key using the fifth key, deriving the control key from the decrypted third key and the system common key, and decrypting the control information using the control key, the control information that includes a key for decrypting a content is encrypted. As a result, the security is further highly protected. Meanwhile, when the decryption conditions and charging information of a content are also included in the control information, these information are also highly protected against fraudulent acts such as tampering. Note that when the fourth and fifth keys are supposed to be a secret key and a public key corresponding to the secret key, for instance, encryption dependent on the secret key is performed on the control information. As a result, even if the public key stored in the apparatus that is to decrypt the content is decrypted, the secret key is not known when an elliptic curve cryptosystem is used. As a result, the control information may be protected with high security.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENTS (The First Embodiment)

An explanation of a music content replay/recording system according to the first embodiment of the present invention will be given with reference to figures.

(Structure)

Figure 1:
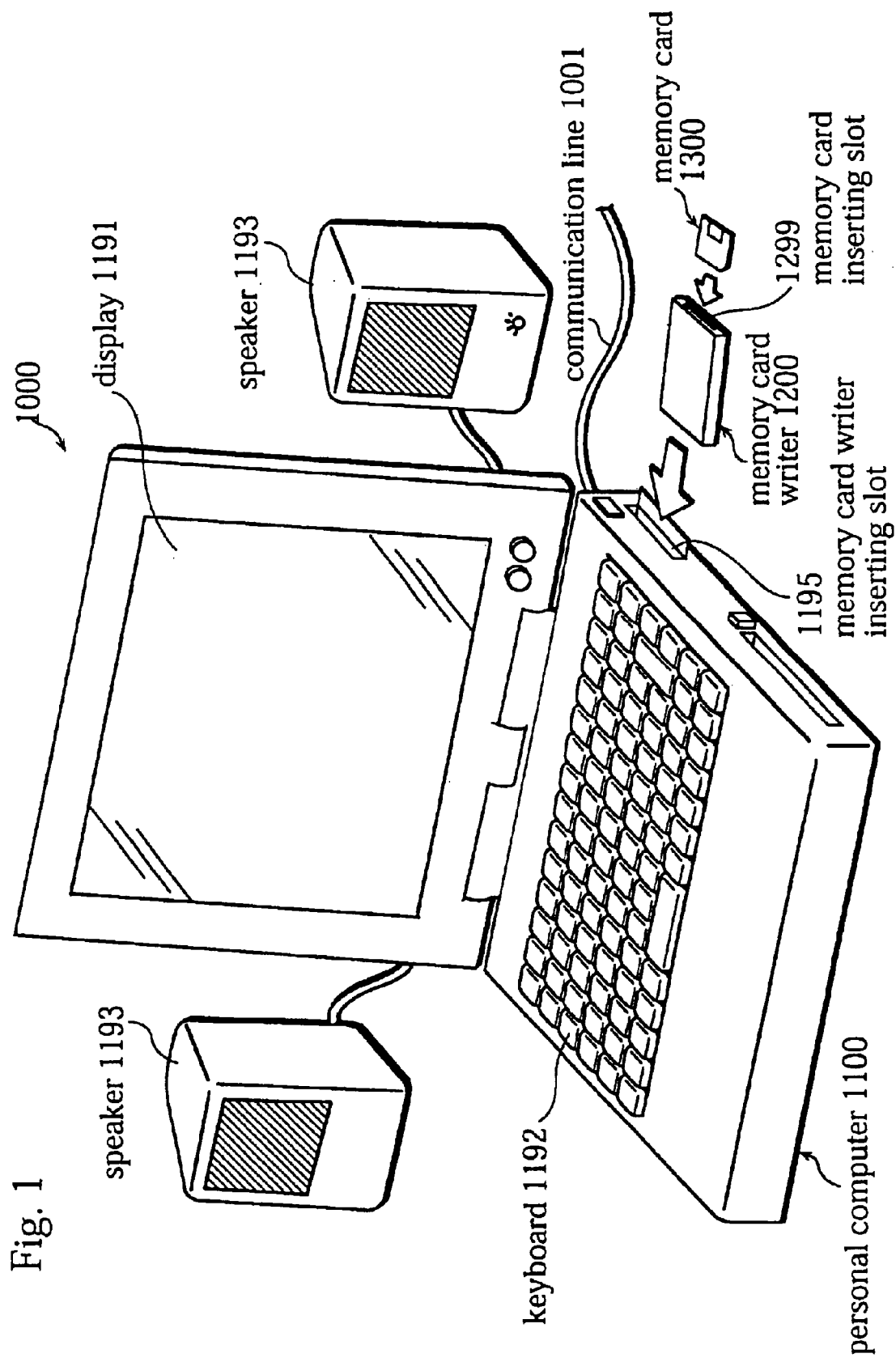
FIG. 1 shows an external view of a music content replay/recording system 1000 according to the first embodiment of the present invention.

FIG. 1 shows an external view of a music content replay/recording system 1000 according to the first embodiment of the present invention.

The music content replay/recording system 1000 is a system in which a music content that has been received via a communication line 1001 is replayed using a personal computer 1100 and the music content is recorded on a memory card 1300. The memory card 1300 is a semiconductor memory that is several millimeters in thickness and 2 centimeters in length and width. The memory card 1300 has a 64 megabytes of storage capacity, and has a built-in control circuit. The user inserts the memory card 1300 into a memory card replay apparatus to have a music content that has been recorded on the memory card 1300 be read and replayed by the memory card replay apparatus and enjoy the replayed music via headphones and the like.

As shown in FIG. 1, the music content replay/recording system 1000 includes the personal computer 1100 having a display 1191 and a keyboard 1192, and memory card writer 1200, which is inserted into the personal computer 1100.

The personal computer 1100 is a personal computer that includes a CPU, a memory, a hard disk and the like and executes a program for replaying a music content according to user instructions. The personal computer 1100 is connected to speakers 1193 and the communication line 1001 and has a memory card writer inserting slot 1195, which is a so-called PC card slot.

A memory card writer 1200 is a so-called PC card and has a memory card inserting slot 1299 for inserting the memory card 1300.

Figure 2:
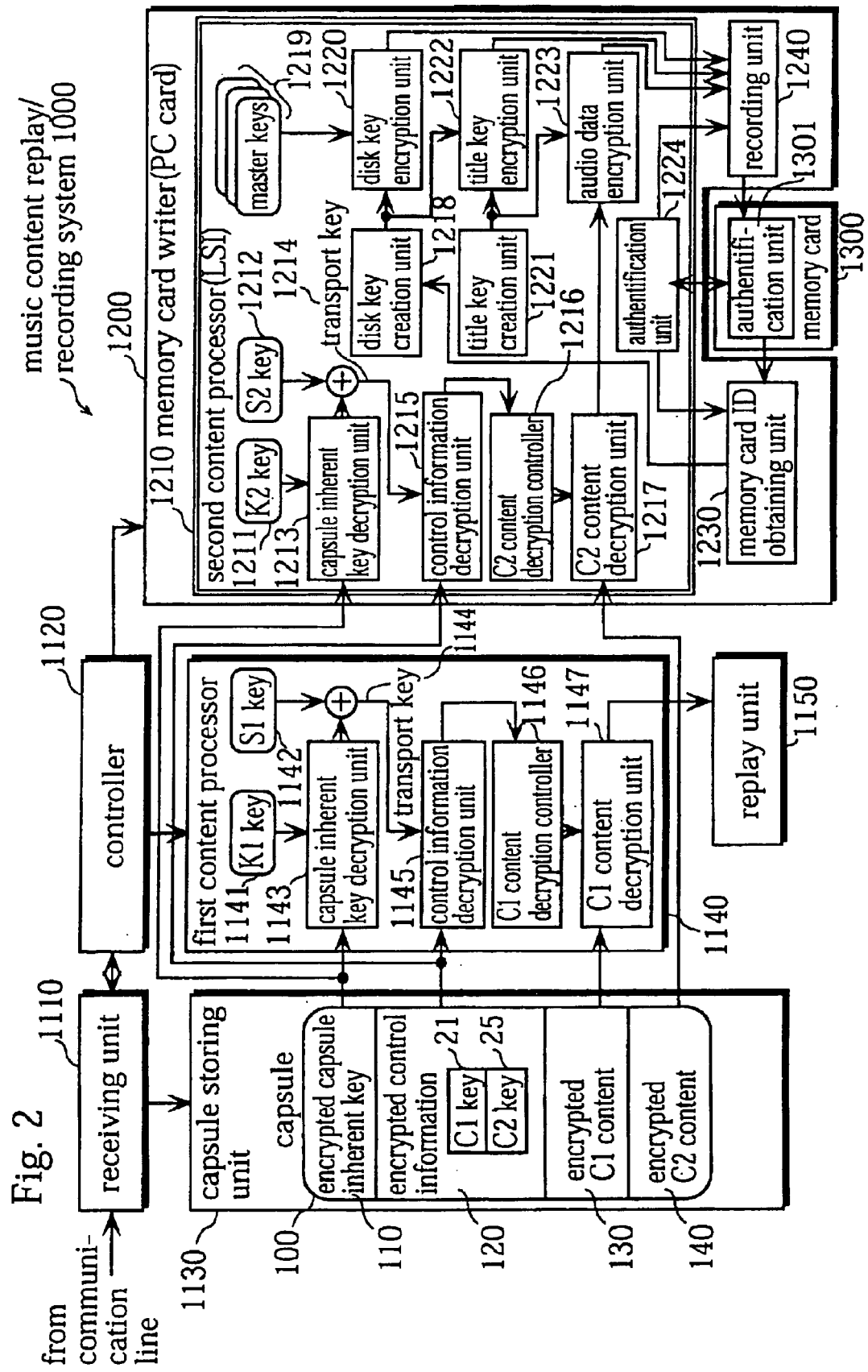
FIG. 2 is a functional block diagram of the music content replay/recording system 1000 according to the first embodiment of the present invention.

FIG. 2 is a functional block diagram of the music content replay/recording system 1000 according to the first embodiment of the present invention.

The music content replay/recording system 1000 functionally includes a receiving unit 1110, a controller 1120, a capsule storing unit 1130, a first content processor 1140, a replay unit 1150, and the memory card writer 1200. In addition to the music content replay/recording system 1000, FIG. 2 shows the memory card 1300 that is inserted into the memory card writer 1200 and a capsule 100 that the receiving unit 1110 receives from the communication line 1001 and stores in the capsule storing unit 1130. Here, the capsule 100 is data that is input into the music content replay/recording system 1000 from the communication line 1001 and includes encrypted music contents and encrypted control information relating to the music contents. A detailed explanation of the capsule 100 will be given later.

The receiving unit 1110, the controller 1120, the first content processor 1140, and the replay unit 1150 are functions realized when the program for replaying a music content in the memory of the personal computer 1100 is executed by the CPU. The capsule storing unit 1130 is one area of the memory or the hard disk of the personal computer 1100.

The program for replaying a music content is a program for having the user select a music content to be received and receiving user instruction to replay or record the selected music content. The controller 1120 is a function for receiving a user operation of the keyboard 1192 and instructing to receive, replay, and record a music content according to the user operation.

When receiving an instruction to receive a music content, the receiving unit 1110 receives a capsule, i.e., data including encrypted music contents, from the communication line 1001, stores the capsule in the capsule storing unit 1130, and informs the controller 1120 of the location where the capsule has been stored. A capsule is distributed through, for instance, the Internet from music content distributers and the like. Here, for convenience in explanation, the capsule 100 is assumed to have been stored in the capsule storing unit 1130 by the receiving unit 1110 as shown in FIG. 2.

When receiving an instruction to replay the music content and information on the location where the capsule 100 has been stored from the controller 1120, the first content processor 1140 executes a process for decrypting an encrypted C1 content 130 and outputs the decrypted encrypted C1 content 130 to the replay unit 1150.

There are two types of music content, i.e., a music content for sample with a lower quality that has been sampled at a 16-KHz sampling rate and a music content for sale with a higher quality that has been sampled at a 64-KHz sampling rate. In this specification, the former one is called a "C1 content" and the latter one is called a "C2 content". An encrypted C1 content 130 is the C1 content that has been encrypted, and an encrypted C2 content 140 is the C2 content that has been encrypted. Note that a detailed explanation of the first content processor 1140 will be given later with an explanation of the contents of the capsule 100.

The replay unit 1150 is a function that replays the C1 content that has been transferred from the first content processor 1140 and has the speakers 1193 sound. In addition, the replay unit 1150 expands the music content since music contents are compressed according to an MPEG (Moving Picture Experts Group) audio standard.

Figure 3:
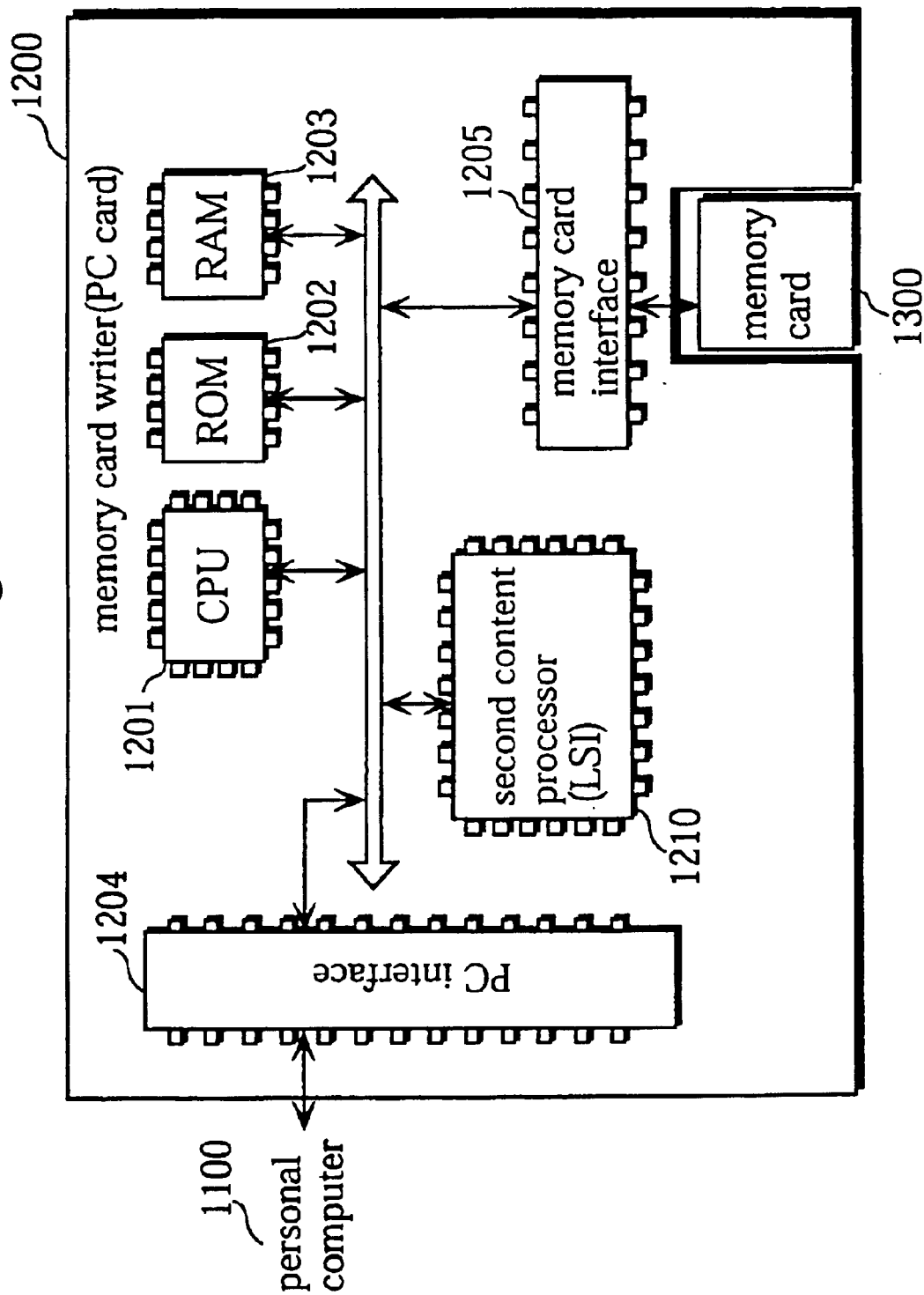
FIG. 3 shows the hardware configuration of a memory card writer 1200.

The memory card writer 1200 is a PC card that has the hardware configuration shown in FIG. 3. The memory card writer 1200 has a function to decrypt the encrypted C2 content 140 in the capsule 100, to encrypt the decrypted C2 content 140 in another cipher, and to record the newly encrypted C2 content on the memory card 1300 when receiving an instruction to record and the information on the location where the capsule 100 has been stored from the controller 1120.

FIG. 3 shows the hardware configuration of the memory card writer 1200.

As shown in FIG. 3, the memory card writer 1200 includes a CPU 1201, a ROM 1202, a RAM 1203, a PC interface 1204, a memory card interface 1205, and a second content processor, i.e., an LSI having a plurality of terminals as hardware. In the memory card writer 1200, all the elements are connected by a bus. The memory card writer 1200 communicates data with the personal computer 1100 via the PC interface 1204 according to a PCMCIA (Personal Computer memory Card International Association) standard and with the memory card 1300 via the memory card interface 1205.

Here, the CPU 1201 is an element to control the memory card writer 1200 that executes the programs recorded on the ROM 1202 and uses the RAM 1203 as the work area. A second content processor 1210 is a tamperproof LSI package that is wrapped with a lead for current supply. The "tamperproof" indicates protection against unauthorized access. The second content processor 1210 is formed on one silicon board, i.e., a one-chip integrated circuit. In addition, it is impossible to both electrically and physically examine the internal data of the second content processor 1210. More specifically, in the second content processor 1210, the internal data of the LSI package is held in the EEPROM, and the lead is severed when the LSI package is opened. Under the circumstances, when the LSI package is opened, the current supply to the LSI package is cut off and the internal data that is composed of electrical charge stored in the capacitor is cleared.

The memory card writer 1200 functionally includes the second content processor 1210, a memory card ID obtaining unit 1230, and a recording unit 1240 as shown in FIG. 2. The second content processor 1210 decrypts the encrypted C2 content 140 and newly encrypts the decrypted encrypted C2 content 140 for recording audio data. The memory card ID obtaining unit 1230 obtains the memory card ID of the memory card 1300 from the memory card 1300. The recording unit 1240 records the encrypted audio data on the memory card 1300. Note that the second content processor 1210 further includes an authentification unit 1224 for performing authentification of the correctness of the memory card 1300. A detailed explanation of the operations by the second content processor 1210 will be given later.

(Data Structure and Relating Process)

An explanation of the contents of the capsule 100 will be given below. The capsule 100 is data created by a neutral institution for protecting copyrights, for instance, the Copyright Protection Center. The Copyright Protection Center receives a music content and the control information relating to the music content from a music content provider and the like, and encrypts the music content and the control information to create a capsule 100.

The capsule 100 that is input into the music content replay/recording system 1000 is composed of a 160-bit encrypted capsule inherent key 110, an encrypted control information 120 of a fixed length, and the encrypted C1 and C2 contents 130 and 140 whose data length can change according to the contents as shown in FIG. 2.

Figure 4:
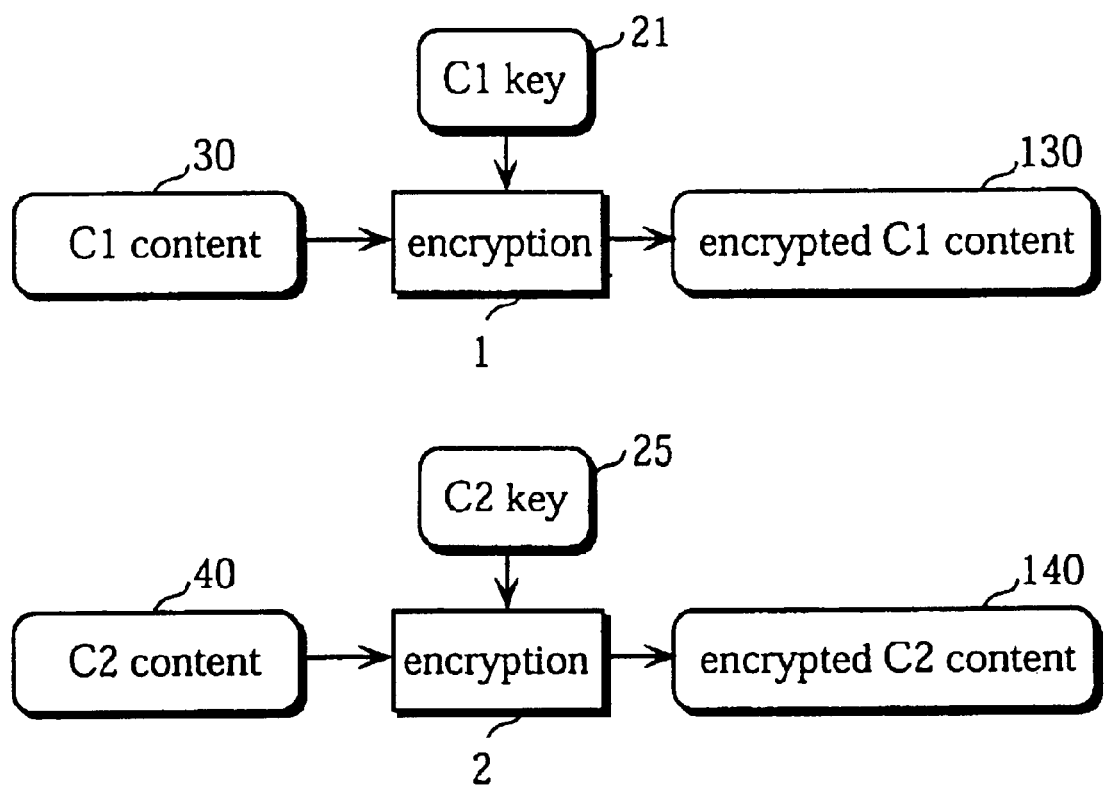
FIG. 4 is a data flowchart showing the process for creating an encrypted C1 content 130 and an encrypted C2 content 140.

FIG. 4 is a data flowchart showing the process for creating the encrypted C1 content 130 and the encrypted C2 content 140.

As shown in FIG. 4, the encrypted C1 content 130 is data that is created by encrypting a plaintext, a C1 content 30 with a C1 key 21. In this case, the C1 key 21 is a 64-bit key data, and a block cipher system, for instance, a DES (Data Encryption Standard) algorithm is used.

On the other hand, the encrypted C2 content 140 is data that is created by encrypting a plaintext, a C2 content 40 with a C2 key 25. In this case, the C2 key 25 is a 128-bit key data, and a block cipher system, for instance, an algorithm according to a DES algorithm is used. Note that each of the C1 content 30 and the C2 content 40 is compressed according to an MPEG audio standard.

Figure 5:
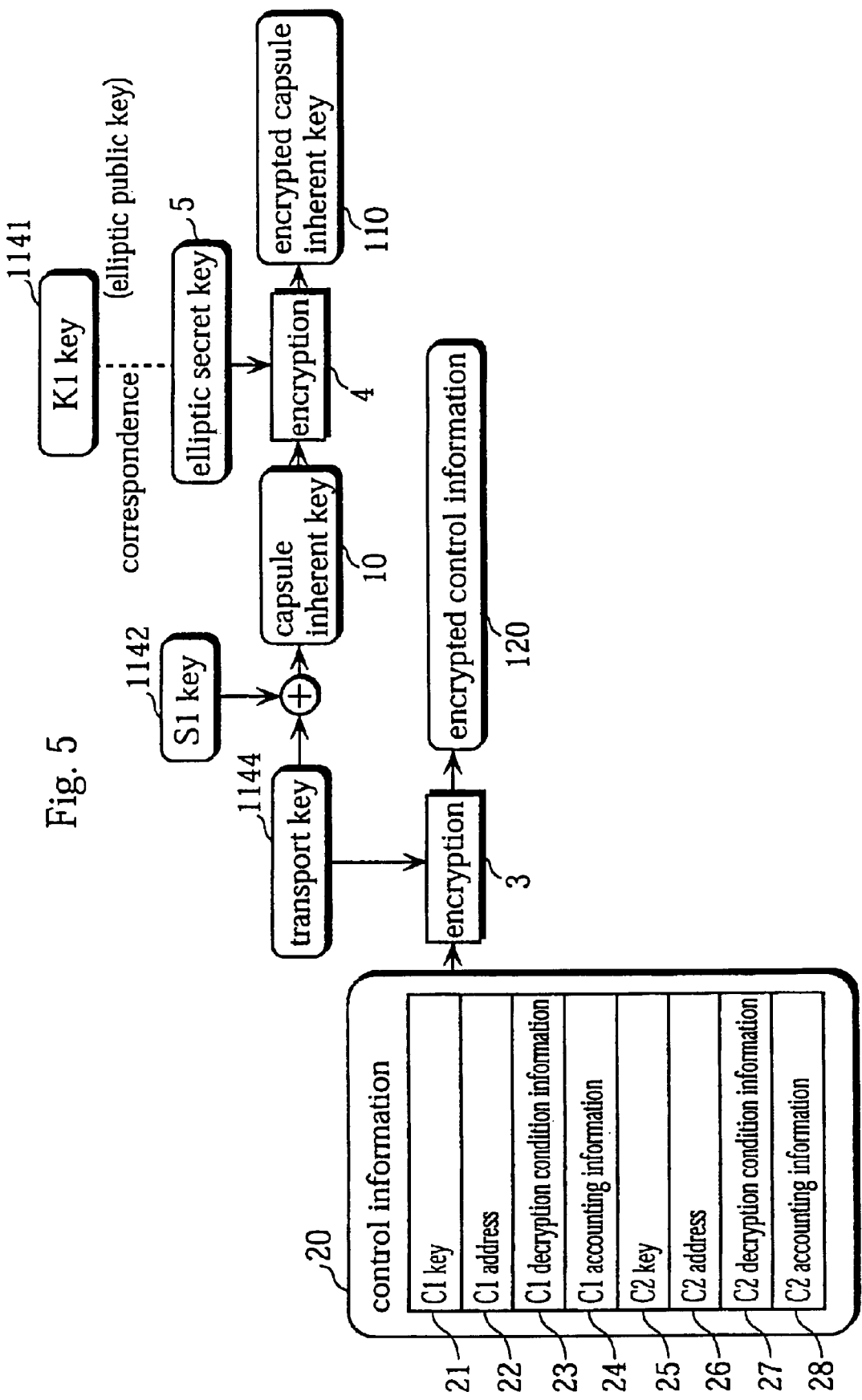
FIG. 5 is a data flowchart showing the process for creating encrypted capsule inherent key 110 and encrypted control information 120.

FIG. 5 is a data flowchart showing the process for creating the encrypted capsule inherent key 110 and the encrypted control information 120.

As shown in FIG. 5, the encrypted control information 120 is data that is created by encrypting control information 20 with a transport key 1144. Here, the control information 20 is information relating to the C1 content 30 and the C2 content 40 shown in FIG. 4. The control information 20 includes the C1 key 21, a C1 address 22, C1 decryption condition information 23, C1 accounting information 24, the C2 key 25, a C2 address 26, C2 decryption condition information 27, and C2 accounting information 28. Meanwhile, in an encryption 3, a block cipher system, for instance, an algorithm according to a DES algorithm is used.

Here, the C1 address 22 and the C2 address 26 are the relative address of the encrypted C1 content 130 and that of the encrypted C2 content 140, respectively. The C1 decryption condition information 23 and the C2 decryption condition information 27 are information showing the conditions for decrypting the C1 content 30 and C2 content 40, respectively, for instance, the dates when it is allowed to decrypt the C1 content 30 and C2 content 40. Meanwhile, the C1 accounting information 24 and the C2 accounting information 28 are information on the amounts that are to be charged when the C1 content 30 and the C2 content 40 are decrypted, i.e., the charge for trial and purchase of the music content.

The transport key 1144 is a 160-bit key data that the Copyright Protection Center freely determines.

Meanwhile, the encrypted capsule inherent key 110 is data that is created by encrypting a capsule inherent key 10, which has been obtained by the exclusive-OR of the transport key 1144 and an S1 key 1142, using an elliptic secret key 5 according to an algorithm in an elliptic curve cryptosystem as shown in FIG. 5. Here, the S1 key 1142 is a 160-bit common key having the same value as an S1 key stored in the first content processor 1140 of the music content replay/recording system 1000. The elliptic secret key 5 is a 160-bit secret key that pairs up with a K1 key 1141, which is a public key stored in the first content processor 1140. Note that detailed explanations of elliptic keys are given in "Basic of Encryption Theory" (Douglas R. Stinson, Kyoritsu Shuppan Co., Ltd.).

A detailed explanation of operations by the first content processor 1140 and the second content processor 1210 will be given below that deal with process relating to the content of the capsule 100, which has been created as has been described.

The operations by the first content processor 1140 will be described first.

The first content processor 1140 stores the K1 key 1141 and the S1 key 1142. The first content processor 1140 includes a capsule inherent key decryption unit 1143, a control information decryption unit 1145, a C1 content decryption controller 1146, and a C1 content decryption unit 1147 as its elements.

The capsule inherent key decryption unit 1143 decrypts the encrypted capsule inherent key 110 in the capsule 100 using the K1 key 1141 and outputs the decrypted encrypted capsule inherent key 110. The control information decryption unit 1145 decrypts the encrypted control information 120 in the capsule 100 using the transport key 1144, which is the result of the exclusive-OR of the output decrypted encrypted capsule inherent key 110 and a public key, the S1 key 1142.

The C1 content decryption controller 1146 judges whether the C1 content can be decrypted with reference to the C1 decryption condition information 23 in the control information 20, which is the decrypted encryption control. When it is judged that the C1 content can be decrypted, the C1 content decryption controller 1146 executes an accounting operation with reference to the C1 accounting information 24, and gives a decryption instruction to the C1 content decryption unit 1147. Here, the accounting operation is to transmit information via the communication line 1001 that instructs the user to remit the trial charge to the music provider company and the like from the account of a bank that the user opened in advance. Note that when the trial charge is free, the information is not transmitted.

The C1 content decryption unit 1147 specifies the location of the encrypted C1 content 130 with reference to the C1 address 22 in the control information 20, decrypts the encrypted C1 content 130 using the C1 key 21 in the control information 20, and outputs the C1 content 30 to the replay unit 1150. Note that the decryption algorithm is an algorithm corresponding to the encryption 1 shown in FIG. 4 in a block cipher system.

Then, the operations by the second content processor 1210 will be described below. While the operations by the second content processor 1210 is broadly divided into the decryption of the C2 content 40 and the re-encryption of the decrypted C2 content 40 for recording on the memory card 1300, the decryption of the C2 content 40 is similar to the operations by the first content processor 1140 that has been described.

The second content processor 1210 stores a K2 key 1211 and an S2 key 1212 for the decryption of the C2 content 40. The second content processor 1210 includes a capsule inherent key decryption unit 1213, a control information decryption unit 1215, a C2 content decryption controller 1216, and a C2 content decryption unit 1217 as its elements. The second content processor 1210 further stores a plurality of master keys 1219 for re-encryption for recording on the memory card 1300. The second content processor 1210 further includes a disk key creation unit 1218, a disk key encryption unit 1220, a title key creation unit 1221, a title key encryption unit 1222, an audio data encryption unit 1223, and the authentification unit 1224 as its elements. Here, each master key is key data having the same value of key data that is held in memory card replay apparatus of different manufacturer. Each of the master keys is key data that has different content. The master key for a plurality of manufacturers are stored in the second content processor 1210 stores so that the memory card 1300 could be replayed in memory card replay apparatus by the plurality of manufactures.

The capsule inherent key decryption unit 1213 decrypts the encrypted capsule inherent key 110 in the capsule 100 using a public key, the K2 key 1211 and outputs the decrypted encrypted capsule inherent key 110. The control information decryption unit 1215 decrypts the encrypted control information 120 in the capsule 100 using a transport key 1214 that is the result of the exclusive-OR of the output decrypted encrypted capsule inherent key 110 and the S2 key 1212. Here, the transport key 1214 has the same value as the transport key 1144 that has been obtained in the afore-mentioned first content processor 1140. Note that the K2 key 1211 and the S2 key 1212 are key data that can create the encrypted capsule inherent key 110 according to the transport key 1144 as shown in FIG. 5, even if the elliptic secret key 5 and the S1 key 1142 in FIG. 5 are replaced with an ellipse secret key corresponding to a public key, the K2 key 1211 and the S2 key 1212, respectively.

The C2 content decryption controller 1216 judges whether the encrypted C2 content 140 can be decrypted with reference to the C2 decryption condition information 27 in the control information 20 that is the encrypted control information 120 that has been decrypted by the control information decryption unit 1215. When it is judged that the encrypted C2 content 140 can be decrypted, the C2 content decryption controller 1216 executes an accounting operation with reference to the C2 accounting information 28, and gives a decryption instruction to the C2 content decryption unit 1217. Here, the accounting operation by the C2 content decryption controller 1216 is the same as the accounting operation by the C1 content decryption controller 1146, i.e., is to transmit information via the communication line 1001 that instructs the user to remit the charge for purchase to the music provider company and the like from the account of a bank that the user opened in advance. This information is transmitted from the controller 1120 in the personal computer 1100 to the communication line 1001 via the PC interface 1204 in the memory card writer 1200. Note that the C2 content decryption controller 1216 stores the counter value and increments the counter value by 1 whenever the C2 content 40 is decrypted. As a result, the product of the counter value and the charge for sale is obtained, so that an instruction to remit the total amount of charges of one day can be transmitted through the communication line 1001 at night.

The C2 content decryption unit 1217 specifies the location of the encrypted C2 content 140 with reference to the address 26 in the control information 20, decrypts the encrypted C2 content 140 using the C2 key 25, and transfers the C2 content 40 to the audio data encryption unit 1223. Note that the decryption algorithm is an algorithm corresponding to the encryption 2 shown in FIG. 4 in a block cipher system.

Meanwhile, the authentification unit 1224 has the function to perform authentification of each other with an authentification unit 1301 in the memory card 1300. While the authentification unit 1301 performs the authentification of the correctness of apparatus that is to record data on the memory card 1300, the authentification unit 1224 receives authentification information from the authentification unit 1301 to judges the correctness of the memory card 1300 according to the received authentification information. More specifically, for instance, the authentification unit 1224 in the memory card writer 1200 transmits a random number to the authentification unit 1301 in the memory card 1300, and the authentification unit 1301 encrypts the random number according to a secret encryption algorithm and returns the encrypted random number to the authentification unit 1224. When the result of the decryption of the received encrypted random number according to a decryption algorithm is the same as the value of the original random number, the encryption algorithm that the authentification unit 1301 has corresponds to the decryption algorithm that the authentification unit 1224 has. As a result, it is judged that the authentification has been successfully performed. The authentification may be performed in the way described below. The memory card writer 1200 and the memory card 1300 share an authentification key and an authentification method, and the memory card writer 1200 and the memory card 1300 perform authentification of each other according to a challenge response procedure using the authentification key.

When the authentification has been successfully performed, i.e., when it is judged that the memory card 1300 is correct, the authentification unit 1224 gives instructions to allow ID obtaining and to allow recording to the memory card ID obtaining unit 1230 and the recording unit 1240, respectively. When receiving the ID obtainment allowance, the memory card ID obtaining unit 1230 obtains the memory card ID that is inherent information from the memory card 1300, and gives the obtained memory card ID to the disk key creation unit 1218. When receiving the recording allowance, the recording unit 1240 records that data that have been output from the disk key encryption unit 1220, the title key encryption unit 1222, and the audio data encryption unit 1223 on the memory card 1300.

The disk key creation unit 1218 creates a 64-bit disk key including the information on the memory card ID that has been given from the memory card ID obtaining unit 1230. Here, a disk key is key data common to all kinds of memory card that is recording medium.

The disk key encryption unit 1220 encrypts the disk key that has been created by the disk key creation unit 1218 using one of the plurality of master keys 1219 that have been stored in the disk key encryption unit 1220 in advance. The disk key encryption unit 1220 continues to encrypt the same disk key using a different master key 1219 to create the same number of encryption disk keys as that of the master keys 1219, and outputs the created encryption disk keys to the recording unit 1240 in the memory card writer 1200.

The title key creation unit 1221 creates an appropriate 64-bit title key and gives the created title key to the title key encryption unit 1222. Here, the title key indicates key data that can be set for each music content.

The title key encryption unit 1222 encrypts the title key that has been created by the title key creation unit 1221 using the disk key that has been created by the disk key creation unit 1218, and outputs the encrypted title key to the recording unit 1240. Meanwhile, the audio data encryption unit 1223 re-encrypts the C2 content 40 that has been output from the C2 content decryption unit 1217 using the title key that has been created by the title key creation unit 1221, and outputs the re-encrypted C2 content 40 to the recording unit 1240.

The encryption algorithms used by the disk key encryption unit 1220, the title key encryption unit 1222, and the audio data encryption unit 1223 are DES algorithms in a block cipher system.

Note that the recording unit 1240 records the audio data that has been transferred from the audio data encryption unit 1223 in a user accessible area in the memory card 1300 and the encrypted disk key and title key in a system area in the memory card 1300 that cannot be accessed by the user. Meanwhile, memory card replay apparatus into which the memory card 1300 can be inserted is supposed to hold a master key, and has functions to perform the aforementioned encryption process in a reverse order using the encrypted disk key and title key and to replay music by decrypting the audio data when the authentification of the memory card 1300 is successfully performed.

(Operations)

An explanation of operations by the music content replay/recording system 1000, the structure of which has been describe, will be given below.

Figure 6:
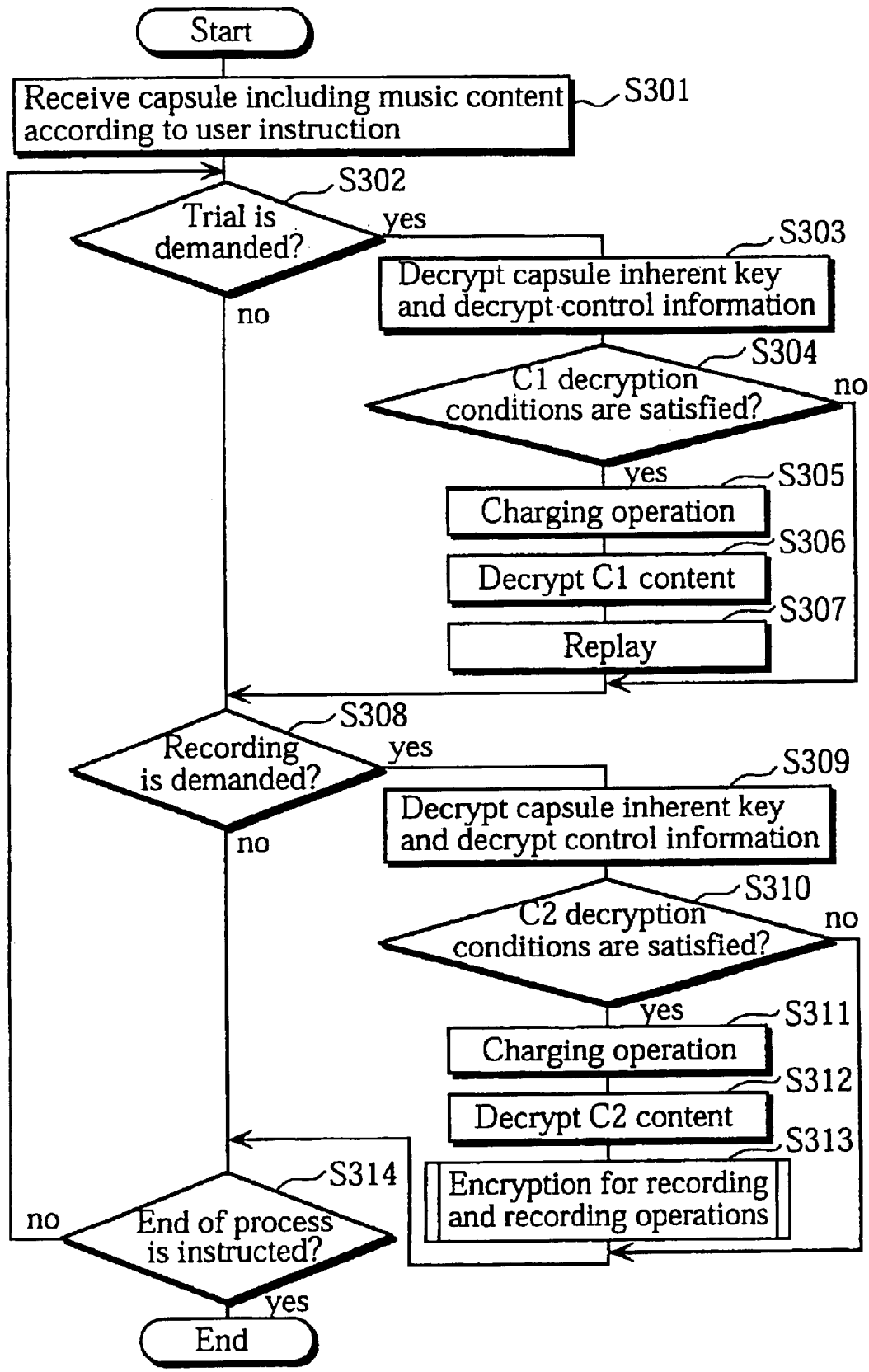
FIG. 6 is a flowchart showing operations by the music content replay/recording system 1000.

FIG. 6 is a flowchart showing operations by the music content replay/recording system 1000.

As shown in FIG. 6, the receiving unit 1110 in the music content replay/recording system 1000 receives a capsule 100 including music contents from the server of a music content provider through the Internet in response to a user instruction, and stores the capsule 100 in the capsule storing unit 1130 (step s301).

Then, when the capsule 100 is stored in the capsule storing unit 1130, the controller 1120 displays a graphical user interface screen on the display 1191 for having the user select one of the trial of the music content, the purchase, and the end of the process.

After that, when detecting that the user has selected the trial (step s302), the controller 1120 instructs the first content processor 1140 to replay the C1 content 30. When receiving the replay instruction, the first content processor 1140 obtains the capsule inherent key 10 by decryption in the capsule inherent key decryption unit 1143 and control information 20 by decryption in the control information decryption unit 1145 (step s303).

After the obtainment of the control information 20 in the control information decryption unit 1145, the C1 content decryption controller 1146 refers to the C1 decryption condition information 23. For instance, when the C1 decryption condition is satisfied, i.e., when it is within the dates set for trial, the number of decryptions is no greater than a predetermined number of times, or the like (step s304), the C1 content decryption controller 1146 performs the accounting operation (step s305), has the C1 content decryption unit 1147 obtain the C1 content 30 by decryption (step s306), has the replay unit 1150 replay the C1 content 30, and has the speakers 1193 sound (Step s307). On the other hand, when the C1 decryption condition is not satisfied, for instance, when it is after the dates for trial (step s304), the operations at steps s305 to s307 are not performed.

Meanwhile, when detecting that the user has selected the purchase, i.e., when detecting that the user requests the music content to be recorded on the memory card 1300 (step s308), the controller 1120 instructs the second content processor 1210 in the memory card writer 1200 to replay the C2 content 40. When receiving the replay instruction, the second content processor 1210 obtains the capsule inherent key 10 by decryption in the capsule inherent key decryption unit 1213 and the control information 20 by decryption in the control information decryption unit 1215 (step s309).

After the obtainment of the control information 20 in the control information decryption unit 1215, the C2 content decryption controller 1216 refers to the C2 decryption condition information 27. For instance, when the C2 decryption condition is satisfied, for instance, when it is within the dates set for purchase (step s310), the C2 content decryption controller 1216 performs the accounting operation (step s311), has the C2 content decryption unit 1217 obtain the C2 content 40 by decryption (step s312), and operations for the re-encryption and recording (step s313). On the other hand, when the C2 decryption condition is not satisfied, for instance, when it is after the dates for purchase (step s310), the operations at steps s311 to s313 are not performed.

Meanwhile, when the controller 1120 detects that the user has selected the end of the process (step s314), all the operations related to the trial and purchase are completed. On the other hand, when the user has not selected the end of the process, the processing returns to step s302. As a result, the user can select the trial and purchase any number of times.

Figure 7:
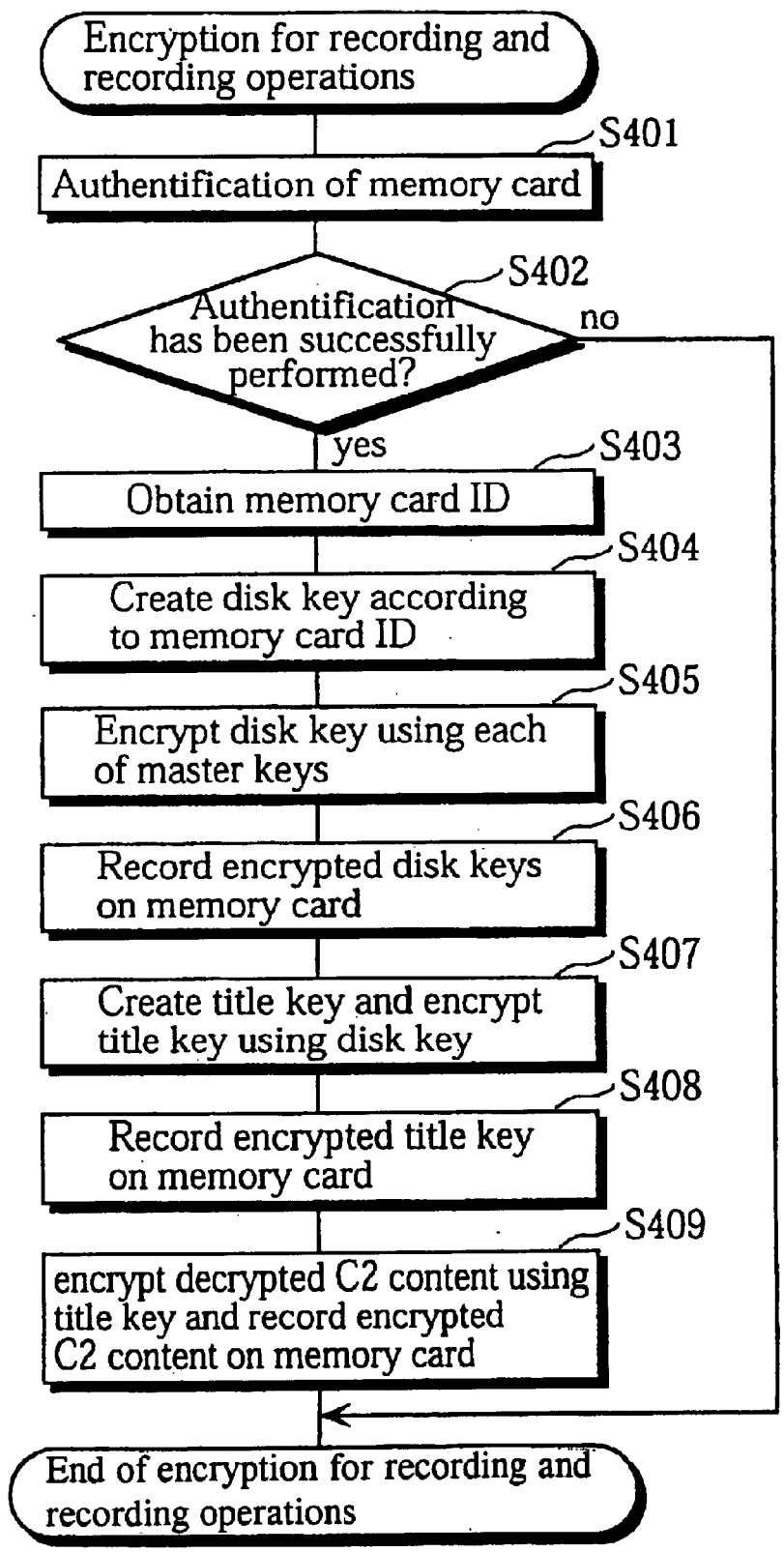
FIG. 7 is a flowchart showing the encryption and recording processing for recording audio data on a memory card.

FIG. 7 is a flowchart showing the encryption and recording processing for recording audio data on the memory card 1300.

As shown in FIG. 7, the authentification unit 1224 performs the authentification of the memory card 1300 (step s401). While when the authentification is not successfully performed, the encryption and recording are not performed, when the authentification is successfully performed (step s402), the operations given below are performed.

The memory card ID obtaining unit 1230 obtains the memory card ID from the memory card 1300 and gives the obtained memory card ID to the disk key creation unit 1218 (step s403). The disk key creation unit 1218 creates a disk key according to the given memory card ID (step S404).

The disk key encryption unit 1220 encrypts the created disk key using each of the plurality of master keys 1219 (step s405), and records the plurality of encrypted disk keys on the memory card 1300 via the recording unit 1240 (step s406).

After the recording of the encrypted disk keys, the title key creation unit 1221 creates a title key, encrypts the created title key using the disk key (step s407), and records the encrypted title key on the memory card 1300 via the recording unit 1240 (step s408). After that the audio data encryption unit 1223 re-encrypts the C2 content 40 that have been-obtained by decryption in the C2 content decryption unit 1217, and records the re-encrypted C2 content 40 on the memory card 1300 via the recording unit 1240 (step s409).

As has been described, the music content replay/recording system 1000 replays a music content and records the music content on a memory card according to a user request.

(The Second Embodiment)

An explanation of a music content replay/recording system 2000, which is the second embodiment of the production protection system according to the present invention, will be given below with reference to figures.

(Structure)

The music content replay/recording system 2000 is a system in which music a content that has been received via a communication line is replayed using a personal computer and the music content is recorded on a memory card. The external view of the music content replay/recording system 2000 is the same as that of the music content replay/recording system 1000 according to the first embodiment shown in FIG. 1.

Figure 8:
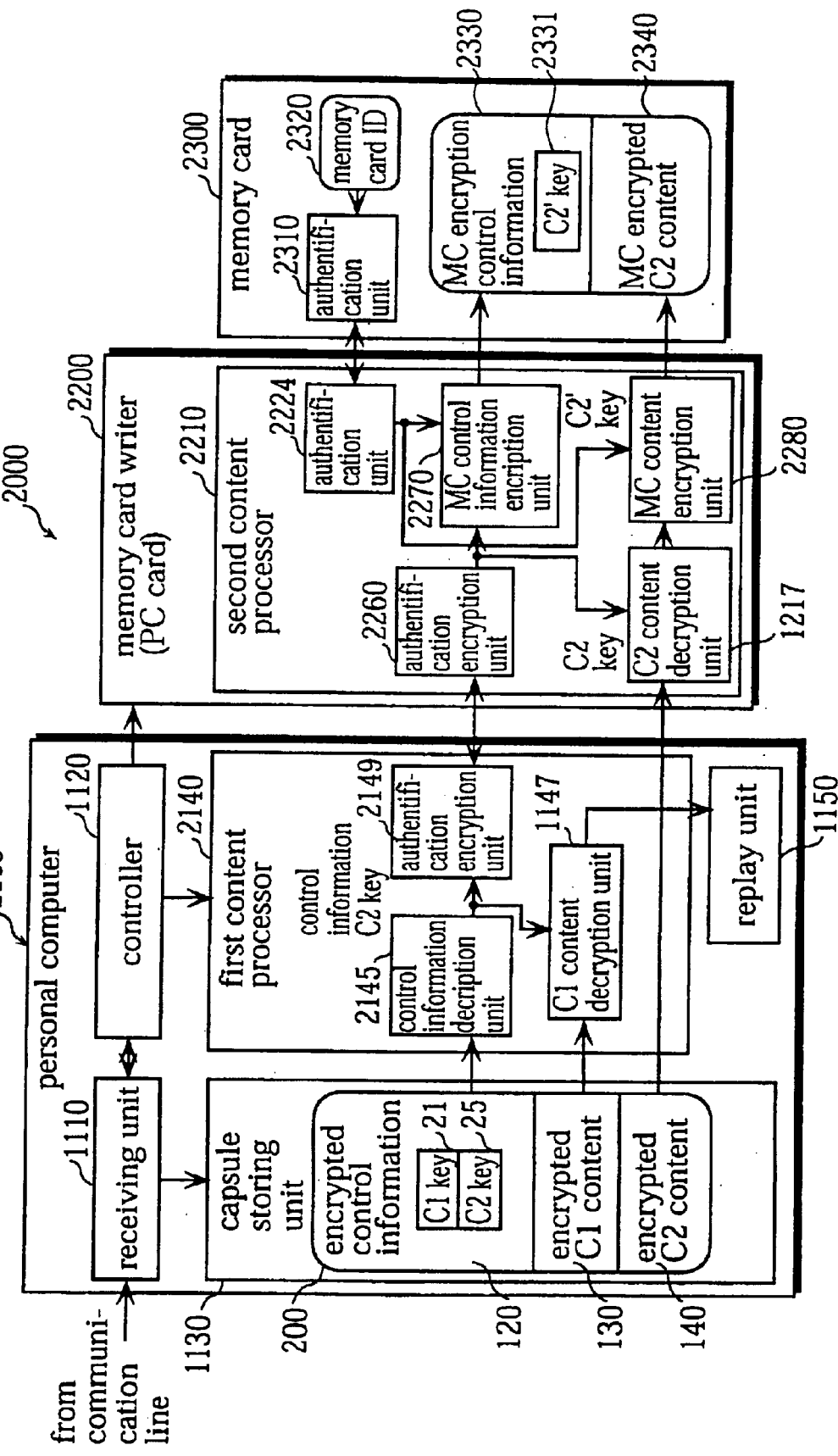
FIG. 8 is a functional block diagram of a music content replay/recording system 2000 according to the second embodiment of the present invention.

FIG. 8 is a functional block diagram of the music content replay/recording system 2000 according to the second embodiment of the present invention.

As shown in FIG. 8, the music content replay/recording system 2000 includes a personal computer 2100 and a memory card writer 2200. the music content replay/recording system 2000 is a system in which an encrypted capsule 200 is received, the music content included in the capsule 200 is replayed by the personal computer 2100, and the music content and the relating control information is recorded on a memory card 2300 that is inserted into the memory card writer 2200.

In FIG. 8, the elements that are the same as in FIG. 2 are given the same reference numbers and explanation of the elements will not given here.

Here, the capsule 200 is composed of an encrypted control information 120 including a C1 key 21 and a C2 key 25, an encrypted C1 content 130, and an encrypted C2 content 140. A detailed explanation of the capsule 200 will be given later.

The personal computer 2100 includes a receiving unit 1110, a controller 1120, a capsule storing unit 1130, a first content processor 2140, and a replay unit 1150. In the personal computer 2100, the encrypted C1 content 130 in the capsule 200 that has been stored in the capsule storing unit 1130 by the receiving unit 1110 is decrypted by the first content processor 2140 and replayed by the replay unit 1150.

Meanwhile, the memory card writer 2200, a PC card which the memory card 2300 is inserted into and is connected to the personal computer 2100, includes a second content processor 2210 composed of tamperproof hardware.

Here, the memory card 2300 includes an authentification unit 2310. On the memory card 2300, a 64-bit memory card ID 2320 is stored in a non-rewritable area in advance, and MC encrypted control information 2330 and MC encrypted C2 content 2340 are recorded in the rewritable area. Note that the MC encrypted C2 content 2340 is C2 content that has been encrypted for recording. On the other hand, the MC encrypted control information 2330 includes a C2' key 2331, which is a key for decrypting the MC encrypted C2 content 2340. The MC encrypted control information 2330 is encrypted MC control information, which is used for controlling the C2 content, for instance.

Note that a detailed explanation of the first content processor 2140 and the second content processor 2210 will be given later.

(Data Structure and Relating Process)

An explanation of the capsule 200 will be given below.

The capsule 200 is data that is created by the Copyright Protection Center as in the case of the capsule 100. The capsule 200 has the same structure as the capsule 100 in the first embodiment from which the encrypted capsule inherent key 110 is removed. Note that the data sizes of the C1 key 21 and C2 key 25 and the encryption algorithm in the encrypted control information 120 in the capsule 200 are different from those in the first embodiment.

The encrypted control information 120 includes information showing the decryption conditions of each content and accounting information, both of which are not illustrated in FIG. 8, in addition to the C1 key 21 and the C2 key 25. In other words, the encrypted control information 120 is data that is created by encrypting the control information 20 that has been described in the first embodiment using FIG. 5. Here, it is assumed that information on the limitation of the number of replaying and replication and accounting information of the C2 content that are recorded on the memory card (referred to "control use information" in this specification) is included in the control information 20 in the second embodiment.

Note that the encrypted control information 120 is created by being encrypted according to an algorithm in an elliptic curve cryptosystem.

The encrypted C1 content 130 is data that is created by encrypting a plaintext, the C1 content 30 using the C1 key 21 (refer to FIG. 4), and the data length can change according to the content. The C1 key 21 is 40-bit key data, and the encryption using the C1 key 21 is performed in a block cipher system. For instance, a DES algorithm is used.

The encrypted C2 content 140 is data that is created by encrypting a plaintext, the C2 content 40 using the C2 key 25 (refer to FIG. 4), and the data length can change according to the content. The C2 key 25 is 56-bit key data, and the encryption using the C2 key 25 is performed in a block cipher system. For instance, a DES algorithm is used.

Note that the C1 content 30 and the C2 content 40 are compressed according to, for instance, an MPEG audio standard.

A detailed explanation of the first content processor 2140 and the second content processor 2210 will be given below, which perform operations relating to the contents of the capsule 200 that are created as has been described.

The first content processor 2140 includes a control information decryption unit 2145, a C1 content decryption unit 1147, and an authentification encryption unit 2149.

Here, the control information decryption unit 2145 obtains the control information 20 by decrypting the encrypted control information 120 according to the algorithm in the elliptic curve cryptosystem, supplies the C1 key 21 in the control information 20 to the C1 content decryption unit 1147, and supplies the C2 key 25 and the control use information to the authentification encryption unit 2149.

Note that the control information decryption unit 2145 includes the function of the C1 content decryption controller 1146. The control information decryption unit 2145 judges whether the C1 content 30 can be decrypted with reference to the C1 decryption condition information 23 in the control information 20. When judging that the C1 content 30 can be decrypted, the control information decryption unit 2145 performs the accounting operation with reference to the C1 accounting information 24, supplies the C1 key 21 to the C1 content decryption unit 1147, and gives the C1 content decryption unit 1147 a decryption instruction. The control information decryption unit 2145 further includes the function of the C2 content decryption controller 1216. The control information decryption unit 2145 judges whether the C2 content 40 can be decrypted with reference to the C2 decryption condition information 27 in the control information 20. When judging that the C2 content 40 can be decrypted, the control information decryption unit 2145 performs the accounting operation with reference to the C2 accounting information 28, supplies the C2 key 25 and the control use information in the control information 20 to the authentification encryption unit 2149. The accounting operation is the same as in the first embodiment, so that the detailed explanation will not given here.

The C1 content decryption unit 1147 decrypts the encrypted C1 content 130 using the C1 key 21 in the control information 20, and outputs the decrypted encrypted C1 content 130 to the replay unit 1150. The decryption algorithm used in the decryption is an algorithm in a block cipher system corresponding to the algorithm that has been used in the encryption of the C1 content 30.

The authentification encryption unit 2149 performs authentification of the memory card writer 2200 by exchanging data between an authentification encryption unit 2260 in the second content processor 2210, encrypts the C2 key 25 and the control use information that have been supplied from the control information decryption unit 2145, and transmits the encrypted C2 key 25 and control use information to the authentification encryption unit 2260.

Meanwhile, the second content processor 2210 includes the authentification encryption unit 2260, a C2 content decryption unit 1217, an authentification unit 2224, an MC control information encryption unit 2270, and an MC content encryption unit 2280.

Here, the authentification encryption unit 2260 performs the authentification of the personal computer 2100 by exchanging data between the authentification encryption unit 2149, receives the encrypted C2 key 25 and control use information that have been transmitted from the authentification encryption unit 2149, and decrypts the encrypted C2 key 25 and control use information.

The C2 content decryption unit 1217 obtains the C2 key 25 from the authentification encryption unit 2260, and decrypts the encrypted C2 content 140 according to an algorithm in a block cipher system corresponding to the encryption of the C2 content 40 using the C2 key 25.

The authentification unit 2224 performs the authentification of the memory card 2300 by exchanging data between the authentification unit 2310 in the memory card 2300, and receives the memory card ID 2320 that has been transmitted from the authentification unit 2310.

The MC control information encryption unit 2270 receives the control use information from the authentification encryption unit 2260, encrypts MC control information composed of the control use information and the C2' key 2331, and records the MC encryption control information 2330 on the memory card 2300.

The MC content encryption unit 2280 encrypts the C2 content 40 that have been decrypted for recording and records the MC encrypted C2 content 2340 on the memory card 2300.

Note that a detailed explanation of the recording on the memory card 2300 by the MC control information encryption unit 2270 and the MC content encryption unit 2280 will be given later.

Here, an explanation of the authentification operations and encryption communication operations performed by the authentification encryption unit 2149 and the authentification encryption unit 2260 will be given below.

The authentification encryption unit 2149 and the authentification encryption unit 2260 use, for instance, JISX5056-2, "Security Technology-Entity Authentification Mechanism-authentification Mechanism Using the Fourth Section Encryption Check Function" by JIS (Japanese Industrial Standard) as the authentification system.

More specifically, correct authentification encryption units use an encryption algorithm E in the same common key system, so that the authentification of the corresponding authentification encryption unit is performed by checking whether the authentification encryption unit uses the same encryption algorithm E. Note that a DES algorithm is used as the encryption algorithm E.

A specific explanation of the procedure of the authentification and encryption communication by the authentification encryption units 2149 and 2260 will be given below with reference to FIG. 9. Note that it is assumed that the authentification encryption unit 2149 uses the algorithm E and the authentification encryption unit 2260 uses an algorithm E' in the explanation of the processing before the authentification has been mutually performed.

Figure 9:
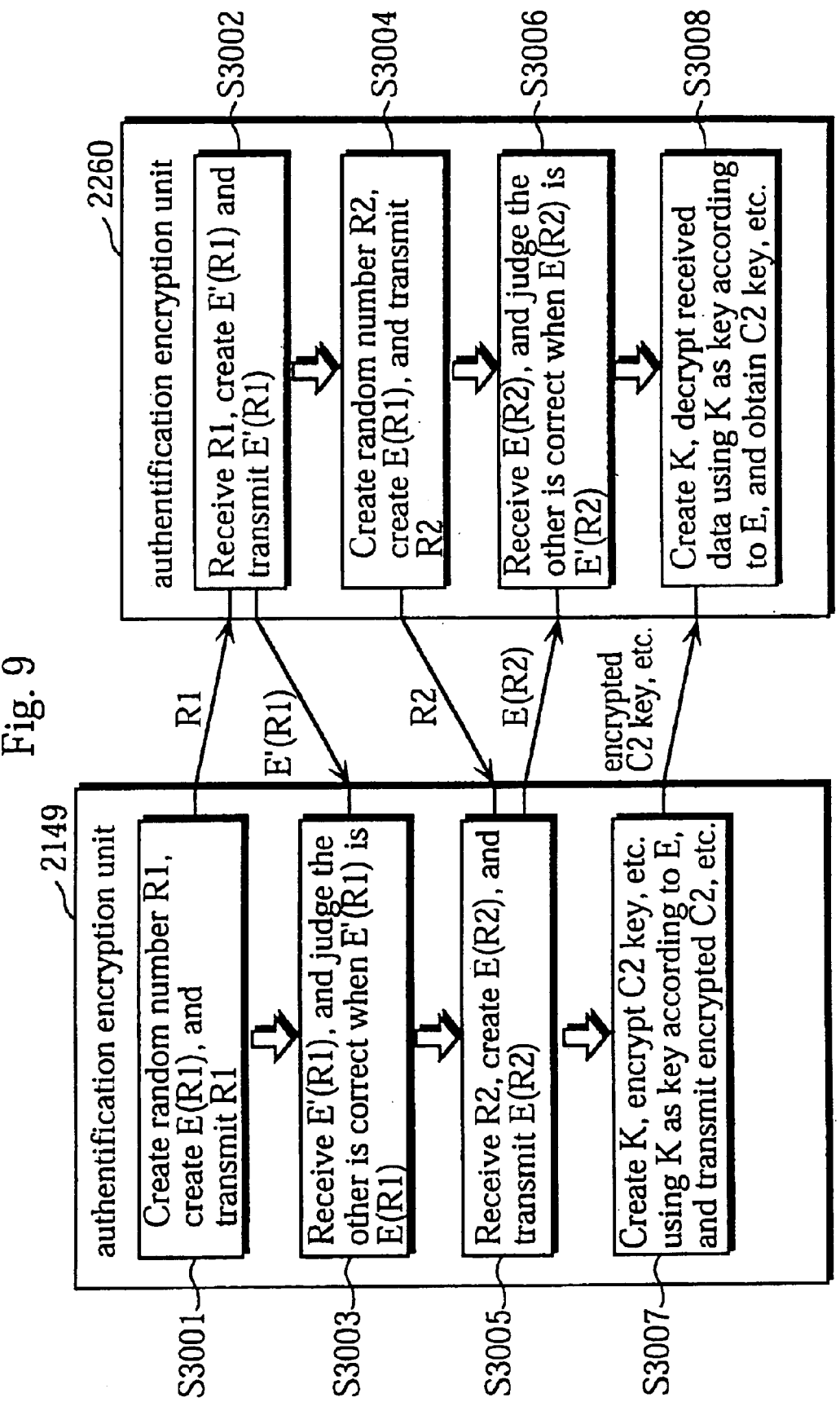
FIG. 9 shows the procedure of authentication and encryption communication by authentication encryption units 2149 and 2260.

FIG. 9 shows the procedure of authentication and encryption communication by the authentication encryption units 2149 and 2260.

The authentification encryption unit 2149 in the personal computer 2100 creates a random number R1, creates a value E(R1) by converting the random number R1 according to the encryption algorithm E, and transmits the random number R1 to the authentication encryption unit 2260 in the memory card writer 2200 (step s3001).

When receiving the random number R1, the authentication encryption unit 2260 in the memory card writer 2200 creates a value E'(R1) by converting the random number R1 according to the encryption algorithm E', and transmits the value E'(R1) to the authentification encryption unit 2149 in the personal computer 2100 (step s3002).

When receiving the value E' (R1), the authentification encryption unit 2149 in the personal computer 2100 verifies whether the received value E'(R1) matches the value E(R1) that has been created by the authentification encryption unit 2149, and judges that the memory card writer 2200 is correct when the value E'(R1) matches the value E(R1) (step s3003).

Similarly, the authentication encryption unit 2260 in the memory card writer 2200 creates a random number R2, creates a value E'(R2) by converting the random number R2 according to the encryption algorithm E', and transmits the random number R2 to the authentification encryption unit 2149 in the personal computer 2100 (step s3004).

When receiving the random number R2, the authentification encryption unit 2149 in the personal computer 2100 creates a value E(R2) by converting the received random number R2 according to the encryption algorithm E, and transmits the created value E(R2) to the authentication encryption unit 2260 in the memory card writer 2200 (step s3005).

When receiving the value E(R2), the authentication encryption unit 2260 in the memory card writer 2200 verifies whether the received value E(R2) matches the value E'(R2) that has been created by the authentification encryption unit 2260, and judges that the personal computer 2100 is correct when the value E(R2) matches the value E'(R2) (step s3006).

When the authentification has been mutually performed as has been described, i.e., when the encryption algorithms E and E' are the same algorithm and the keys used by the authentication encryption units 2149 and 2260 are the same key, each of the authentication encryption units 2149 and 2260 creates a bit string K, which is a result of the input of the exclusive-OR of the values E(R1) and E(R2) into the encryption algorithm E.

After creating the bit string K, the authentification encryption unit 2149 in the personal computer 2100 encrypts the C2 key 25 and the control use information that is the result of decryption by the control information decryption unit 2145 using the bit string K as the key according to the encryption algorithm E, and transmits the encrypted C2 key 25 and control use information to the authentication encryption unit 2260 in the memory card writer 2200 (step s3007).

When receiving the encrypted C2 key 25 and control use information, the authentication encryption unit 2260 in the memory card writer 2200 decrypts the encrypted C2 key 25 and control use information (step s3008).

Note that when it is judged that the authentification encryption units 2149 or 2260 is not correct at steps s3003 or s3006, the following operations will not be performed.

The C2 key 25 and the control use information are securely transmitted from the personal computer 2100 to the memory card writer 2200 according to the procedure.

Here, an explanation of the authentification operations and communication operations performed by the authentification unit 2224 and the authentication unit 2310 will be given below.

The authentification unit 2224 and the authentification unit 2310 use, for instance, JISX5056-2, "Security Technology-Entity Authentification Mechanism-Authentification Mechanism Using the Fourth Section Encryption Check Function" by JIS (Japanese Industrial Standard) as the authentification system.

More specifically, correct authentification units use an encryption algorithm F in the same common key system, so that the authentification of the corresponding authentification unit is performed by checking whether the authentification unit uses the same encryption algorithm F. Note that a DES algorithm is used as the encryption algorithm F.

A specific explanation of the procedure of the authentification and communication by the authentification units 2224 and 2310 will be given below with reference to FIG. 10. Note that it is assumed that the authentification unit 2310 uses the algorithm F and the authentification unit 2224 uses an algorithm F' in the explanation of the processing before the authentification has been mutually performed.

Figure 10:
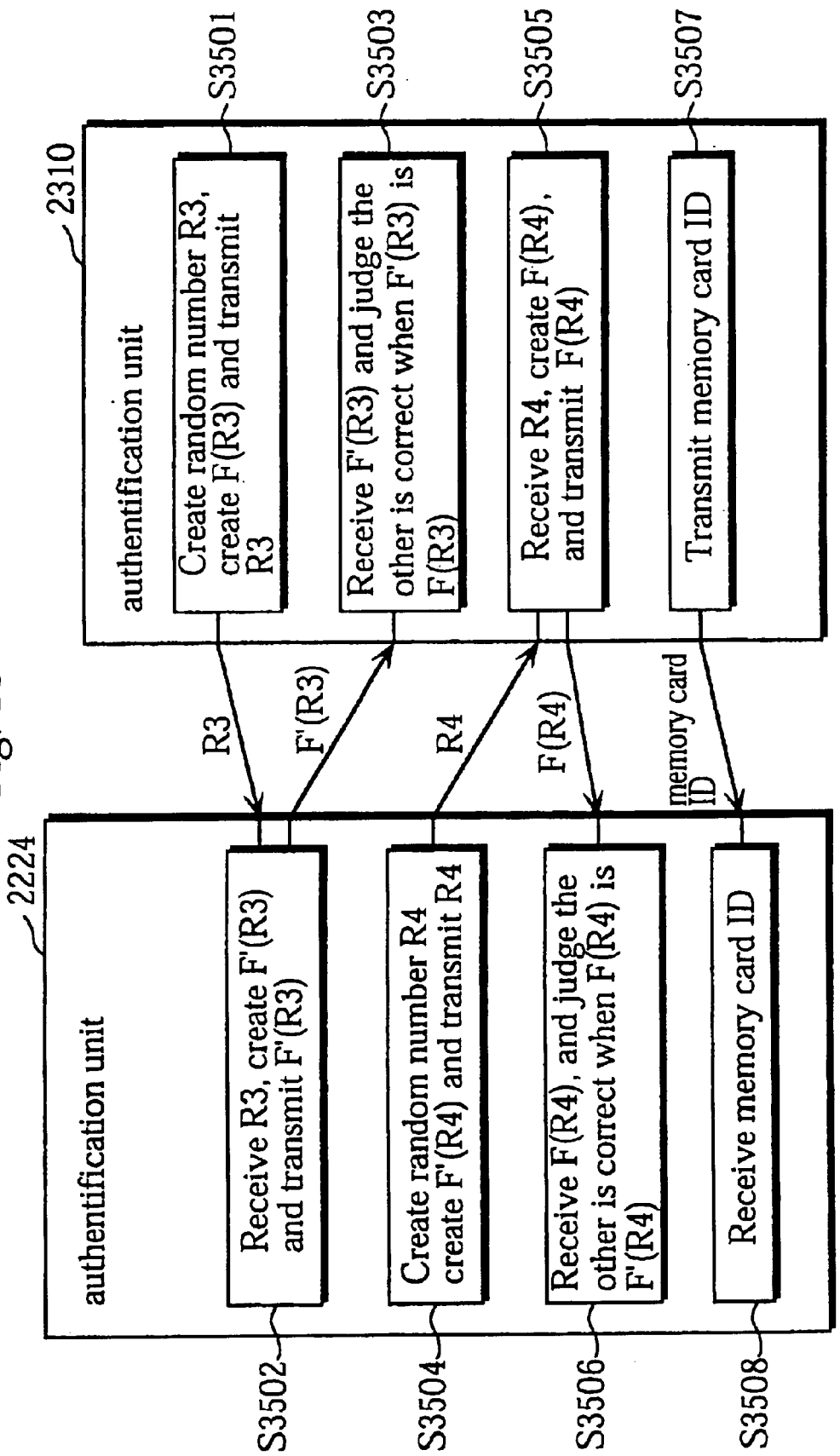
FIG. 10 shows the procedure of authentication and encryption communication by authentication units 2224 and 2310.

FIG. 10 shows the procedure of authentication and communication by the authentication units 2224 and 2310.

The authentification unit 2310 in the memory card 2300 creates a random number R3, creates a value F(R3) by converting the random number R3 according to the encryption algorithm F, and transmits the random number R3 to the authentication unit 2224 in the memory card writer 2200 (step s3501).

When receiving the random number R3, the authentication unit 2224 in the memory card writer 2200 creates a value F'(R3) by converting the random number R3 according to the encryption algorithm F', and transmits the value F'(R3) to the authentification unit 2310 in the memory card 2300 (step s3502).

When receiving the value F'(R3), the authentification unit 2310 in the memory card 2300 verifies whether the received value F'(R3) matches the value F(R3) that has been created by the authentification unit 2310, and judges that the memory card writer 2200 is correct when the value F'(R3) matches the value F(R3) (step s3503).

Similarly, the authentication unit 2224 in the memory card writer 2200 creates a random number R4, creates a value F'(R1) by converting the random number R4 according to the encryption algorithm F', and transmits the random number R4 to the authentification unit 2310 in the memory card 2300 (step s3504).

When receiving the random number R4, the authentification unit 2310 in the memory card 2300 creates a value F(R4) by converting the received random number R4 according to the encryption algorithm F, and transmits the created value F(R4) to the authentication unit 2224 in the memory card writer 2200 (step s3505).

When receiving the value F(R4), the authentication unit 2224 in the memory card writer 2200 verifies whether the received value F(R4) matches the value-F'(R4) that has been created by the authentification unit 2224, and judges that the memory card 2300 is correct when the value F(R4) matches the value F'(R4) (step s3506).

Note that when it is judged that the authentification units 2224 or 2310 is not correct at steps s3503 or s3506, the following operations will not be performed.

When the authentification has been mutually performed by the authentification units 2224 and 2310 as has been described, i.e., when the encryption algorithms F and F' are the same algorithm and the keys used by the authentication units 2224 and 2310 are the same key, the authentification unit 2310 transmits the memory card ID 2320 to the authentification unit 2224 (step s3507), and the authentification unit 2224 receives the memory card ID 2320 (step s3508).

After the authentification has been mutually performed and the authentification unit 2224 receives the memory card ID 2320, the MC control information is encrypted by the MC control information encryption unit 2270, the encrypted C2 content 140 is decrypted by the C2 content decryption unit 1217, and the decrypted C2 content 40 is re-encrypted by the MC content encryption unit 2280 in the second content processor 2210.

Here, an explanation of the procedure of data recording on the memory card 2300 by the MC control information encryption unit 2270 and MC content encryption unit 2280 will be given.

When the mutual authentification of the authentification units 2224 and 2310 has been successfully performed, the authentification unit 2224 that has received the memory card ID 2320 creates a 56-bit memory card inherent key as a result of input of the memory card ID 2320 into an encryption algorithm G. Note that the encryption algorithm G is a DES algorithm in which a secret value is the key.

Then, the authentification unit 2224 creates a 56-bit random number and a 56-bit C2' key, which is a result of the exclusive-OR of the created random number and the memory card inherent key.

After the creation of the memory card inherent key and the C2' key by the authentification unit 2224, the MC content encryption unit 2280 re-encrypts the C2 content using the C2' key, which has been obtained by the decryption in the C2 content decryption unit 1217, and records the re-encrypted C2 content on the memory card 2300. As a result, the MC encrypted C2 content 2340 are recorded on the memory card 2300.

Meanwhile after the creation of the memory card inherent key and the C2' key by the authentification unit 2224, the MC control information encryption unit 2270 encrypts the MC control information composed of the C2' key and the control use information, which has been obtained by the decryption in the authentification encryption unit 2260, using the memory card inherent key as the key. The MC control information encryption unit 2270 records the encrypted MC control information on the memory card 2300. As a result, the MC encryption control information 2330 is recorded on the memory card.

Note that an encryption algorithm that is different from a DES algorithm in part but according to a DES algorithm is used for the encryption in the MC content encryption unit 2280 and the MC control information encryption unit 2270.

Figure 11:
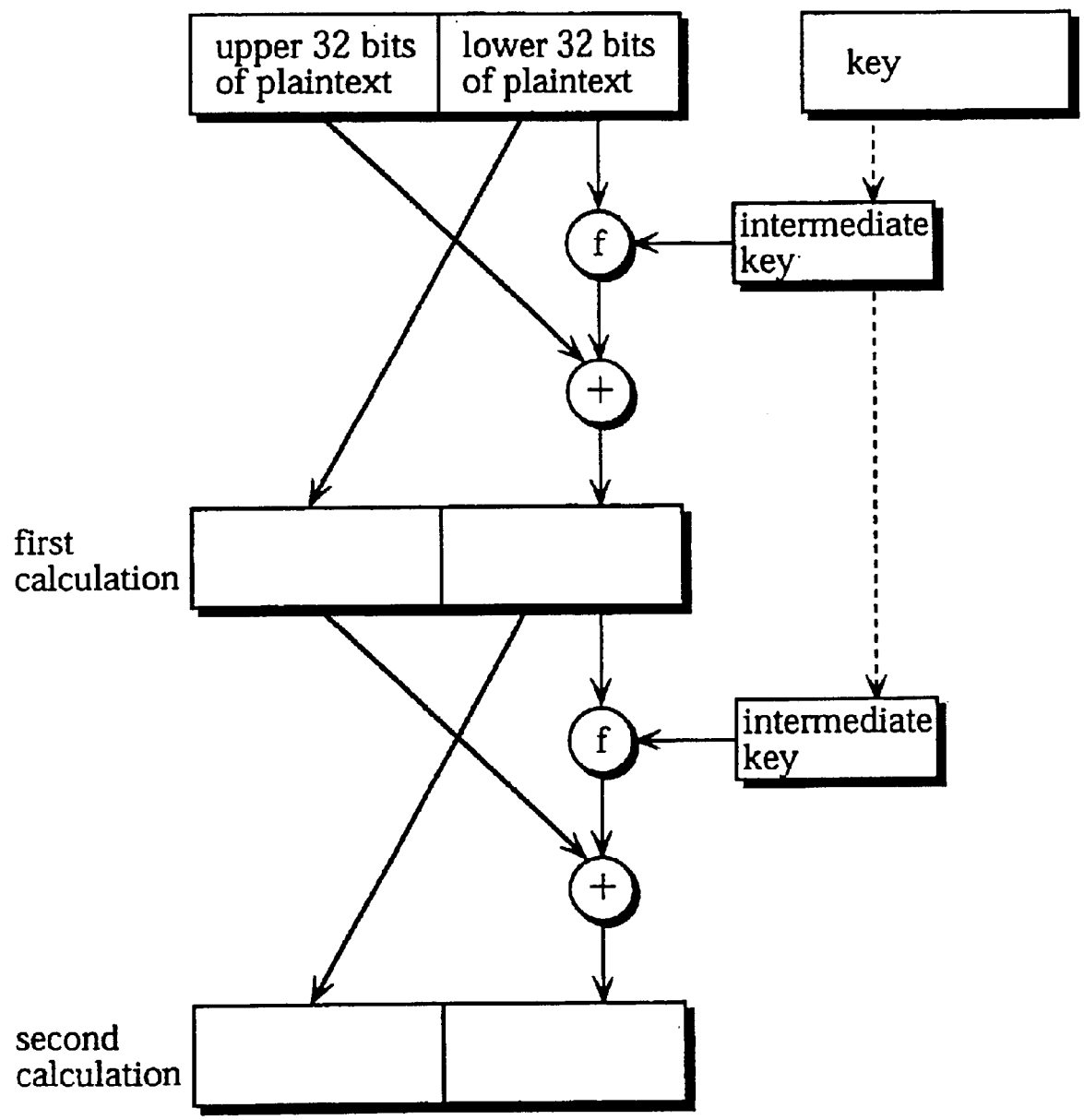
FIG. 11 shows the concept of encrypting a 64-bit plaintext using a 56-bit key according to a DES (Data Encryption Standard) algorithm.

FIG. 11 shows the concept of encrypting a 64-bit plaintext using a 56-bit key according to a DES algorithm. The encryption is performed by repeating a calculation using a function 16 times for the plaintext. FIG. 11 shows the first and second calculations. Note that a mark "+" in FIG. 11 indicates an exclusive-OR.

More specifically, as shown in FIG. 10, the lower 32 bits of the plaintext and an intermediate key that has been derived from the key become the input into a function "f", the exclusive-OR of a 32-bit bit string that is the output from the function "f" and the upper 32 bits of the plaintext becomes the lower 32 bits of the first calculation, and the lower 32 bits of the plaintext becomes the upper 32 bits in the first calculation, in the DES algorithm. The plaintext is encrypted by repeating this procedure 16 times.

Here, the function "f", which outputs 32-bit data, is a function that combines the output results of eight functions g1, g2, g3, . . . , and g8 in a predetermined order and outputs the combined results. The function "f" is expressed as "f=(g1, g2, g3, . . . , and g8)".

Meanwhile, a function "f'" (f'=(g1', g2, g3, g8) can be created by replacing only the function g1 with another function g1', for instance.

As a result, the encryption algorithm used by the MC content encryption unit 2280 and the MC control information encryption unit 2270, can be the algorithm in FIG. 11 in which the function "f" is replaced with the function "f'" when the DES algorithm used by the C2 content decryption unit 1217 is the one shown in FIG. 11.

As has been described, the encryption algorithm used by the C2 content decryption unit 1217 differs from the one used by the MC content encryption unit 2280 in part, so that parts of these algorithms can be shared to some extent when these encryption algorithms are realized by software or hardware. As a result, the cost for development and realization of the encryption algorithm can be reduced compared with using totally different encryption algorithms.

(Supplemental Remarks)

While explanations of the production protection system according to the present invention has been given with reference to the music content replay/recording systems of the first and second embodiments, the present invention is not certainly limited to the embodiments.

(1) While the memory card writer that encrypts the C2 content and records the encrypted C2 content on the memory card is a PC card in the embodiments, the memory card writer is not limited to a PC card. The memory card writer may be a device that may be connected to a personal computer, for instance, by a USB (Universal Serial Bus).

Meanwhile, the receiving unit 1110, the controller 1120, the capsule storing unit 1130, the first content processor 1140, and the replay unit 1150 in the first embodiment are assumed to be realized by the personal computer 1100, and the receiving unit 1110, the controller 1120, the capsule storing unit 1130, the first content processor 2140, and the replay unit 1150 in the second embodiment are assumed to be realized by the personal computer 2100. The personal computers 1100 and 2100, however, may be an electric appliance that includes a memory and a CPU and has a program execution control function. For instance, a TV set with a function of connecting to the Internet.

In addition, while the second content processor 1210 is assumed to be a tamperproof LSI package that is wrapped with a lead for current supply in the first embodiment, the second content processor 1210 must be a tamperproof one but is not necessarily wrapped with a lead.

Further, the second content processor 1210 in the first embodiment and the second content processor 2210 in the second embodiment may be an element such as a personal computer that limits the access to data to be protected like software or executes tamperproof software designed not to be easily read by combining an unnecessary program with a processing program dealing with data to be protected, for instance. Note that the control information decryption unit 2145 and the authentification encryption unit 2149 may be included in the second content processor 2210.

(2) While the audio data, the C2 content that has been obtained by the decryption in the C2 content decryption unit 1217 in the memory card writer 1200, is assumed to be re-encrypted for recording on the memory card in the first embodiment, the audio data may be directly replayed. In this case, when a speaker is connected to the memory card writer 1200, the music comes from the speaker.

(3) While one capsule includes one encrypted C1 content and one encrypted C2 content in the first and second embodiments, one capsule may include only one of encrypted C1 content and encrypted C2 content, and a plurality of encrypted C1 content and encrypted C2 content. In addition, each capsule may include C1 content and encrypted C2 content differently.

Note that a capsule needs to include information such as accounting information on C1 content only when the capsule include C1 content, and information such as accounting information on C2 content only when the capsule include C2 content.

(4) The lengths of key data is described in the embodiments. For instance, the lengths of the C1 key and the C1 key are described as 64 bits and 128 bits in the first embodiment, and those of the C1 key, the C2 key, and the C2' key are described as 40 bits, 56 bits, and 56 bits in the second embodiment. The lengths of the key data, however, are not limited to those values. The K1 key, K2 key, S1 key, S2 key, and transport key may have different lengths.

Note that the encrypted capsule inherent key 110 may be the combination of a key that is decrypted by the K1 key and a key that is decrypted by the K2 key. Meanwhile, the exclusive-OR for the calculation of the transport key may be performed not for all the bit but for a predetermined number of bits.

In addition, the decryption algorithms used by the C1 and C2 content decryption units may be algorithms that are downloaded through the communication line. In this case, the decryption algorithm may be downloaded only when the correctness of signature information is acknowledged. Note that the decryption algorithm for the C2 content is written in the second content processor 1210 via the PC interface 1204 from the personal computer 1100 by the execution of a program for transmission included in the ROM 1202 in the memory card writer 1200 by the CPU 1201 in this case.

As in the case of the decryption algorithms used by the C1 and C2 content decryption units, the encryption algorithms used by the disk key encryption unit 1220, the title key encryption unit 1222, and the audio data encryption unit 1223 may be downloaded, and the correctness of signature information is acknowledged when the algorithms are downloaded.

Here, an example of the acknowledgment of the correctness of signature information will be given below. Suppose that a decryption algorithm and signature information are supposed to be transmitted from a neutral institution for protecting copyrights. The signature information is encrypted using a secret key, a public key corresponding to the secret key is stored in the ROM 1202 in advance, and the signature information is decrypted using the public key by executing the afore-mentioned program for transmission to acknowledge the signature information.

Meanwhile, although the C1 and C2 keys are included in the control information in the first and second embodiments, the C1 and C2 keys may be key data that have been stored in the C1 and C2 content decryption units, respectively.

(5) the encryption algorithms for the C1 and C2 contents in the first and second embodiment are not limited to DES algorithms.

In addition, the procedures of authentication performed for between the authentification encryption unit 2149 and the authentification encryption unit 2260 and between the authentification unit 2224 and the authentification unit 2310 are not limited to the afore-mentioned procedures. Meanwhile, although DES algorithms are used as the encryption algorithms E, F, and G in the second embodiment, algorithms other than DES algorithms may be used.

Note that the encryption algorithm E and the encryption algorithms used by the C2 content decryption unit 1217 may be the same DES algorithm, and the encryption algorithms F and G and the encryption algorithms used by the MC control information encryption unit 2270 and MC content encryption unit 2280 are all the same algorithm that differs from a DES algorithm in part. Further, each of these encryption algorithms may be an algorithm that is different from each other in part. In other words, the cost of manufacturing can be reduced as long as parts of the algorithms are shared to some extent even if the algorithms are not DES algorithms.

(6) While the capsule is transmitted through the communication line in the first and second embodiments, it is not limited to this case. For instance, the capsule may be stored in a recording medium such as an optical disc. In this case, the receiving unit 1110 only needs to be the one that reads the capsule from the recording medium and stores the capsule in the capsule storing unit 1130.

(7) While the title key creation unit 1221 creates the title key in an appropriate way in the first embodiment, it is not limited to this case. For instance, the title key creation unit 1221 may refer to the C2 content that the C2 content decryption unit 1217 has output and create a title key according to data such as music title, or may refer to the C2 key in the control information that is a result of the decryption by the control information decryption unit 1215 and create a title key according to the C2 key.

In addition, the title key creation unit 1221 may create the title key according to a value that is inherent in the memory card writer 1200.

(8) While the disk key creation unit 1218 creates the disk key according to the memory card ID in the first embodiment, the disk key creation unit 1218 may create a disk key independently of the memory card ID. The disk key may be created in a manner described below. An inherent disk key that has been encrypted by a master key inherent in a medium is supposed to be recorded on the memory card, and the disk key creation unit 1218 creates a disk key by decrypting the inherent disk key using the master key. In this case, the disk key encryption unit 1220 does not need to be included in the second content processor 1210, and only the title key and the encrypted audio data need to be written in the memory card.

(9) While the audio data encryption unit 1223 encrypts the C2 content, i.e., the audio data in the first embodiment, the audio data encryption unit 1223 may encrypt part of the C2 content and output the C2 content.

(10) While the plurality of master keys are stored in the second content processor 1210 in advance in the first embodiment, one master key may be stored.

In addition, the second content processor 1210 may download the master keys from an outside network through the communication line and the personal computer and store the downloaded master keys. The second content processor 1210 may have a function of removing a specific master key. Further, the second content processor 1210 may download the master keys only when the correctness of the master keys are acknowledged with the signature information.

Note that the master keys are written in the second content processor 1210 via the PC interface 1204 from the personal computer 1100 by the execution of the program for transmission included in the ROM 1202 in the memory card writer 1200 by the CPU 1201 in this case. Here, the signature information is acknowledged in the same manner as in the case of the afore-mentioned decryption algorithms.

Similarly, when it is instructed to remove a specific master key from an outer network, the specific master key may be removed only when the correctness of the signature information is acknowledged.

(11) In the first embodiment, the authentification of the memory card is performed (step s401), and the audio data is not encrypted and recorded when the authentification has not been successfully performed (step s402). In the case of the failure of the authentification, only the recording on the memory card must be prevented. As a result, the audio data may be encrypted for any case, and the data that is the result of the encryption may be prevented from being output from the second content processor 1210 only for the failure of the authentification, for instance.

(12) The procedure for recording the encrypted data on the memory card in the first embodiment (steps s406, s408, and s409) is not limited to this order of the steps. The recording procedure may be executed in any order.

Meanwhile, data of a plurality of contents may be recorded in the same memory card. In this case, the title key creation unit 1221 creates title keys the number of which corresponds to the number of contents, the title key encryption unit 1222 outputs encrypted title keys the number of which correspond to the number of the contents, and the audio data encryption unit 1223 outputs encrypted data the number of which corresponding to the number of the contents.

(13) While the capsule is created by the Copyright Protection Center in the first embodiment, the capsule may be created by content providers and other providers, for instance. In this case, a content provider or another provider may encrypt the capsule inherent key using a public key and a replay apparatus may decrypt the encrypted capsule inherent key using a secret key corresponding to the public key for increasing the degree of security.

(14) While the remittance instructing information is transmitted as the accounting operation in the first embodiment, it is not limited to the transmission of this information. For instance, the number of decryption may be included in the charging information, and the charging information may be encrypted and transmitted to the institution to be charged.

In this case, the charging information may be considered a content, encrypted in the same format as the capsule, and transmitted. For this purpose, encryption units for creating capsules need to be included in the first content processor 1140 and the second content processor 1210. The encryption in these encryption units needs to be performed according to the same procedure as the creation of a capsule shown in FIGS. 4 and 5.

Note that the recording unit 1240 may record the decryption condition information and the charging information when recording the content on a recording medium such as a memory card. In this case, the decryption condition information and the charging information may be also recorded in a more secure condition. By doing so, it is possible to control and charge the replay of the content after the recording on the recording medium.

In addition, even if the control information that has been described in the second embodiment is not included in the control information 20, the MC control information encryption unit 2270 may calculate the MC control information including the charging information and the information on the replay and duplication control and on the decryption conditions of the MC encrypted C2 content 2340 using information that has been stored in advance, may encrypt the calculated information, and may record the encrypted information as the MC encryption control information 2330 on the memory card 2300.

(15) While the bit string K is obtained by the exclusive-OR operation of the values E(R1) and E(R2) in the second embodiment, the obtainment of the bit string K is not limited to this example. Only the authentification encryption units 2149 and 2260 must commonly obtain or derive the string K.

In addition, the C2' key may not be created by the exclusive-OR of the memory card inherent key and the random number.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A production protection system dealing with contents that are digital production, comprising:
   obtaining means for obtaining data including a first content, on which first encryption has been performed and a second content, on which second encryption has been performed, the second encryption is more difficult to break than the first encryption;
   first content decryption means for decrypting the first content using a first decryption method that corresponds to the first encryption when the data that has been obtained by the obtaining means includes the first content; and
   second content decryption means for decrypting the second content using a second decryption method that corresponds to the second encryption and is more difficult than the first decryption method when the data that has been obtained by the obtaining means includes the second content.

2. The production protection system according to claim 1, wherein
   the first encryption is performed using a first key,
   the second encryption is performed using a second key, which has a larger data size than the first key,
   the data that is to be obtained by the obtaining means further includes control information, which has the first and second keys, for controlling operations on each content included in the data to be obtained,
   the first content decryption means decrypts the first content using the first key, and
   the second content decryption means decrypts the second content using the second key.

3. The production protection system according to claim 2, wherein the control information is encrypted using a control key that has been derived from a third key and a system common key, and included in the data that is to be obtained by the obtaining means,
   the third key is encrypted using a fourth key and included in the data that is to be obtained,
   the first content decryption means includes a first control information decryption unit far storing the system common key and a fifth key corresponding to the fourth key in advance, decrypting the third key using the fifth key, deriving the control key from the decrypted third key and the system common key, and decrypting the control information using the control key, and
   the second content decryption means includes a second control information decryption unit for storing the system common key and the fifth key corresponding to the fourth key in advance, decrypting the third key using the fifth key, deriving the control key from the decrypted third key and the system common key, and decrypting the control information using the control key.

4. The production protection system according to claim 1, wherein each of the first content and the second content is multimedia data that is digital production, and
   the first content represents the same information as the second content but at a tower reproduction quality level.

* * * * *

UNITED STATES PATENT AND TRADEMARK OFFICE
CERTIFICATE OF CORRECTION

PATENT NO.         : 6,862,582 B2
APPLICATION NO. : 10/729186
DATED                : March 1, 2005
INVENTOR(S)       : Shunji Harada et al.

Page 1 of 1

It is certified that error appears in the above-identified patent and that said Letters Patent is hereby corrected as shown below:

Column 26,
Line 34, delete "far" and insert -- for --.
Line 52, delete "tower" and insert -- lower --.

Signed and Sealed this

Twentieth Day of June, 2006

JON W. DUDAS
*Director of the United States Patent and Trademark Office*